US012700186B2

(12) United States Patent
Walens et al.

(10) Patent No.: US 12,700,186 B2
(45) **Date of Patent: \*Aug. 4, 2026**

(54) SYSTEM AND METHOD FOR HAPTIC MAPPING OF A CONFIGURABLE VIRTUAL REALITY ENVIRONMENT

(71) Applicant: Exploring, Inc., Atlanta, GA (US)

(72) Inventors: David Walens, Marietta, GA (US);
Matthew Kelly, Acworth, GA (US);
Geoffrey Wright, Marietta, GA (US)

(73) Assignee: EXPLORING DIGITAL, LLC,
Marietta, GA (US)

( \* ) Notice: Subject to any disclaimer, the term of this patent is extended or adjusted under 35 U.S.C. 154(b) by 372 days.

This patent is subject to a terminal disclaimer.

(21) Appl. No.: 17/701,276

(22) Filed: Mar. 22, 2022

(65) Prior Publication Data

US 2022/0215638 A1 Jul. 7, 2022

Related U.S. Application Data

(63) Continuation-in-part of application No. 17/062,928, filed on Oct. 5, 2020, now Pat. No. 11,315,332, which
(Continued)

(51) Int. Cl.
*G06T 19/00* (2011.01)
*E04B 1/19* (2006.01)
(Continued)

(52) U.S. Cl.
CPC .............. *G06T 19/006* (2013.01); *E04B 1/19* (2013.01); *E04B 2/7425* (2013.01); *E04B 5/02* (2013.01);
(Continued)

(58) Field of Classification Search
CPC ....... G06T 19/006; G06T 19/003; E04B 1/19; E04B 2/7425; E04B 5/02; E04B 5/10;
(Continued)

(56) References Cited

U.S. PATENT DOCUMENTS 4,934,858 A 6/1990 Beaulieu
5,848,501 A 12/1998 Taipale et al.
(Continued)

OTHER PUBLICATIONS

Patent Cooperation Treaty: International Search Report and Written Opinion of PCT/US24/10601 (related application); Shane Thomas; May 17, 2024; 10 Pages.
(Continued)

*Primary Examiner* — William A Beutel

(57) ABSTRACT

A system for providing a virtual reality experience includes a plurality of wall panels at a plurality of wall panel locations defining an X by Y area within the interior of the plurality of wall panels. At least one haptic feedback device associated with at least one of the plurality of wall panels for providing haptic feedback to a user. A transition area is associated with the X by Y area. A virtual reality system displays a first virtual reality environment to the user within at least a portion of the X by Y area. The first virtual reality environment defines a first virtual reality pathway for the user within the X by Y area to the at least one haptic feedback device. The virtual reality system displays a second virtual reality environment different from the first virtual reality environment within at least a portion of the X by Y area. The second virtual reality path defining a second virtual pathway for the user within the X by Y area to the at least one haptic feedback device that is different from the first virtual pathway responsive to the user entering the transition area while in the first virtual reality environment.

7 Claims, 28 Drawing Sheets

Related U.S. Application Data is a continuation of application No. 16/355,218, filed on Mar. 15, 2019, now Pat. No. 10,796,492, which is a continuation of application No. 15/991,686, filed on May 29, 2018, now Pat. No. 10,255,729.

(51) Int. Cl.

| | | |
|---|---|---|
| *E04B 2/74* | (2006.01) | |
| *E04B 5/02* | (2006.01) | |
| *E04B 5/10* | (2006.01) | |
| *E04F 15/02* | (2006.01) | |
| *G06F 3/01* | (2006.01) | |

(52) U.S. Cl.
CPC .......... *E04B 5/10* (2013.01); *E04F 15/02044* (2013.01); *G06F 3/011* (2013.01); *G06F 3/012* (2013.01); *G06F 3/016* (2013.01); *G06T 19/003* (2013.01); *E04B 2001/1936* (2013.01); *E04B 2001/1966* (2013.01); *E04B 2002/7483* (2013.01); *E04B 2002/7487* (2013.01); *E04F 2015/02066* (2013.01)

(58) Field of Classification Search
CPC ..... E04B 2001/1936; E04B 2001/1966; E04B 2002/7483; E04B 2002/7487; E04B 2/82; E04B 1/6162; E04B 2/7427; E04F 15/02044; E04F 2015/02066; G06F 3/011; G06F 3/012; G06F 3/016
See application file for complete search history.

(56) References Cited

U.S. PATENT DOCUMENTS

| | | | |
|---|---|---|---|
| 6,792,319 | B1 | 9/2004 | Bilger |
| 9,215,276 | B2 | 12/2015 | Gillo et al. |
| 9,311,742 | B1 | 4/2016 | Glover et al. |
| 10,242,501 | B1 | 3/2019 | Pusch et al. |
| 11,097,186 | B1 | 8/2021 | Hickman et al. |
| 11,170,575 | B1 * | 11/2021 | Noris ...................... G06F 3/011 |
| 11,184,362 | B1 | 11/2021 | Krol et al. |
| 12,105,866 | B2 | 10/2024 | Geisert et al. |
| 2004/0104935 | A1 | 6/2004 | Williamson et al. |
| 2006/0084356 | A1 | 4/2006 | Stallworth |
| 2007/0050716 | A1 | 3/2007 | Leahy et al. |
| 2007/0265089 | A1 | 11/2007 | Robarts et al. |
| 2009/0187264 | A1 | 7/2009 | Hashimoto et al. |
| 2009/0251457 | A1 | 10/2009 | Walker et al. |
| 2009/0254843 | A1 | 10/2009 | Van Wie et al. |
| 2010/0093438 | A1 | 4/2010 | Baszucki et al. |
| 2010/0294340 | A1 | 11/2010 | Cunningham et al. |
| 2011/0107239 | A1 | 5/2011 | Adoni et al. |
| 2011/0111871 | A1 | 5/2011 | Legary et al. |
| 2011/0113351 | A1 | 5/2011 | Phillips |
| 2011/0201414 | A1 | 8/2011 | Barclay et al. |
| 2011/0250957 | A1 | 10/2011 | Suzuki et al. |
| 2012/0071244 | A1 | 3/2012 | Gillo et al. |
| 2012/0115603 | A1 | 5/2012 | Shuster |
| 2012/0206577 | A1 | 8/2012 | Guckenberger et al. |

| | | | |
|---|---|---|---|
| 2013/0067846 | A1 | 3/2013 | Kvols et al. |
| 2013/0141428 | A1 | 6/2013 | Gipson |
| 2013/0227437 | A1 | 8/2013 | Brody et al. |
| 2013/0249947 | A1 | 9/2013 | Reitan |
| 2015/0069710 | A1 | 3/2015 | Spigner |
| 2015/0120533 | A1 | 4/2015 | Jung et al. |
| 2015/0278263 | A1 | 10/2015 | Bowles et al. |
| 2016/0049003 | A1 | 2/2016 | Shuster et al. |
| 2016/0140752 | A1 | 5/2016 | Shuster et al. |
| 2016/0253842 | A1 | 9/2016 | Shapira et al. |
| 2017/0001112 | A1 | 1/2017 | Gilmore et al. |
| 2017/0003738 | A1 | 1/2017 | Silkin et al. |
| 2017/0006074 | A1 | 1/2017 | Oates, III |
| 2017/0123752 | A1 | 5/2017 | Nadler |
| 2017/0178272 | A1 | 6/2017 | Lashkari et al. |
| 2017/0285733 | A1 * | 10/2017 | Bretschneider ......... A63F 13/69 |
| 2017/0326457 | A1 | 11/2017 | Tilton et al. |
| 2017/0336863 | A1 | 11/2017 | Tilton et al. |
| 2017/0354064 | A1 | 12/2017 | Milek et al. |
| 2018/0117465 | A1 | 5/2018 | Voris et al. |
| 2018/0144525 | A1 * | 5/2018 | Gutierrez .................. A63J 1/02 |
| 2018/0151000 | A1 | 5/2018 | Liv |
| 2018/0168064 | A1 | 6/2018 | Gustaferro et al. |
| 2018/0169528 | A1 | 6/2018 | Hinoshita et al. |
| 2019/0227312 | A1 | 7/2019 | Lai et al. |
| 2019/0374857 | A1 | 12/2019 | Deller et al. |
| 2020/0183567 | A1 | 6/2020 | Gullicksen |
| 2020/0195914 | A1 | 6/2020 | Langois et al. |
| 2020/0225747 | A1 | 7/2020 | Bar-Zeev et al. |
| 2020/0309944 | A1 | 10/2020 | Thoresen et al. |
| 2020/0320794 | A1 | 10/2020 | Huang et al. |
| 2021/0158576 | A1 | 5/2021 | Nuber |
| 2021/0250386 | A1 | 8/2021 | Cozzi et al. |
| 2021/0327140 | A1 | 10/2021 | Rothkopf et al. |
| 2021/0364790 | A1 | 11/2021 | Gullicksen et al. |
| 2021/0370166 | A1 | 12/2021 | Hickman et al. |
| 2022/0343615 | A1 | 10/2022 | Tal et al. |

OTHER PUBLICATIONS

SimTek Game Development, "How to Teleport Your Group To A Private Server in Robolox", https://www.youtube.com/watch?v=rlqUqvdFB2A, Jul. 25, 2021 (Year: 2021).

Xiao, Jixiong, "A Study of Navigation Aids in Video Games", University of Dublin, May 2020—https://publications.scss.tcd.ie/theses/diss/dissertation-index.20. php; https://publications.scss. tcd. ie/theses/diss/2020/TCD-SCSS-DISSERTATION-2020-021.pdf (Year:2020).

Marwecki, Sebastian, et al., "Virtual Space—Overloading Physical Space with Multiple Virtual Reality Users", CH I '18: Proceedingsof the 2018 CH I Conference on Human Factors in Computing Systems, Apr. 2018, Paper No. 241, pp. 1-10 (Year: 2018).

Vredenberg, Bjorn, "Signposting, Mise-en-Scene, and Environmental Storytelling: Understanding signposting as part of the embedded narrative in environmental storytelling", Utrecht University (Year: 2017).

Patent Cooperation Treaty: International Preliminary Report on Patentability for PCT/US2024/010601 (related case), Sun Hwa Lee; Jul. 17, 2025; 9 pages.

* cited by examiner

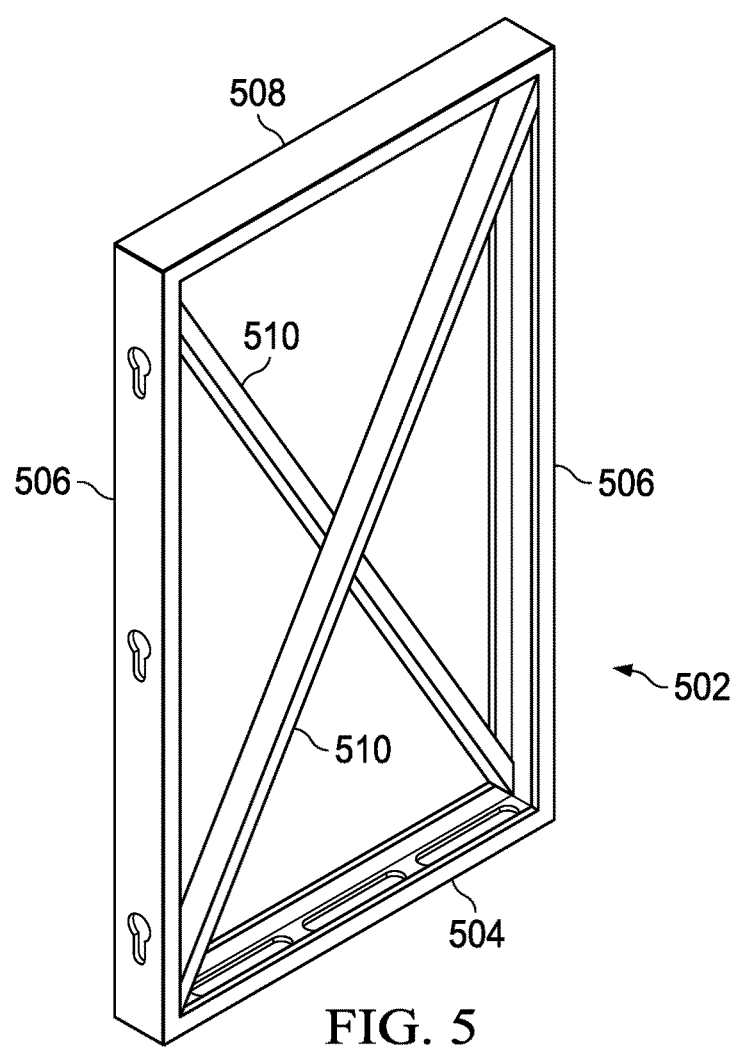
FIG. 5
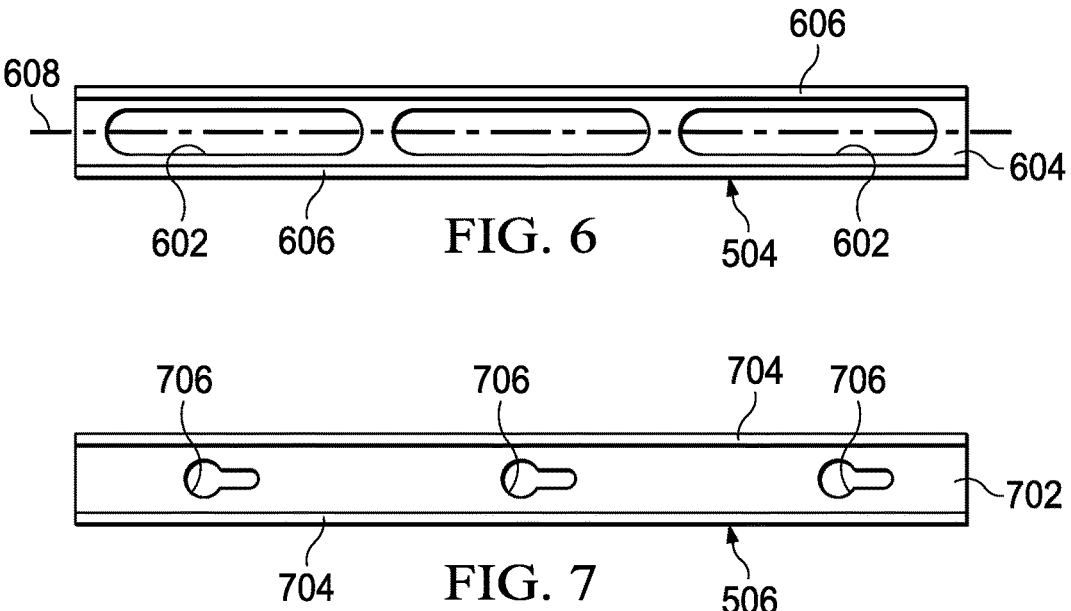
FIG. 6
FIG. 7

1102

1104

1106

1108

2202

2204 — VR SYSTEM INTERFACE

2205 — GAME TO PLAN MAPPING

2206 — CONFIGURABLE HARDWARE DATABASE

2208 — ENVIRONMENT PLAN GENERATOR

2210 — PARTS LIST GENERATOR

2212 — OUTPUT INTERFACE

2304 — VR SYSTEM

2308 — CONFIGURABLE VR ENVIRONMENT

2306 — HEADSET

USERS — 2302

3202 — ASSEMBLE PLURALITY OF FLOOR PANELS

3204 — ASSEMBLE PLURALITY OF WALL PANELS

3206 — PLACE TRANSPORT MODULE

3208 — PLACE HAPTIC FEEDBACK DEVICES

3210 — GENERATE FIRST VR ENVIRONMENT HAVING FIRST PATHWAY

3212 — DISPLAY FIRST VR ENVIRONMENT

3214 — VR USER ENTERED TRANSPORT MODULE?

NO

YES

A

A

GENERATE SECOND VR ENVIRONMENT HAVING SECOND PATHWAY — 3216

DISPLAY SECOND VR ENVIRONMENT — 3218

COMPLETE — 3220

3502 — START

3504 — DETERMINE PLAYER POSITION

3506 — DESIRED MOVEMENT?

YES → BRIGHTEN ENVIRONMENT AND LIGHT IN DESIRED DIRECTION — 3508

NO

3510 — DARKEN ENVIRONMENT AND BRIGHTEN LIGHT IN DESIRED DIRECTION

VR USER REACHED DESTINATION ?

NO

3512

YES

3514 — COMPLETE

3602

| | 3604 | | 3604 | |
| | | 3604 | | 3604 |
| 3604 | 3604 | 3604 | 3604 | |

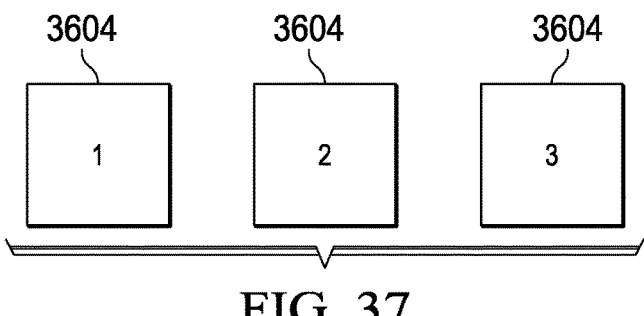
FIG. 37
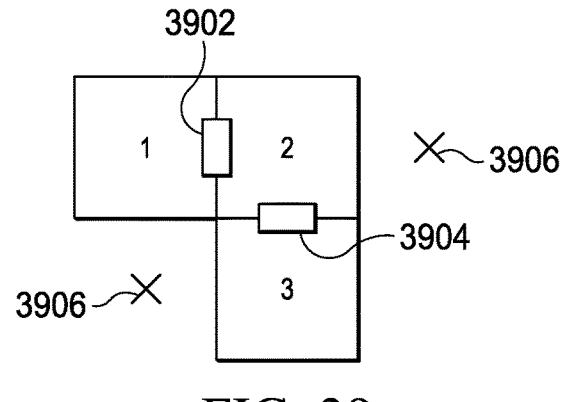
FIG. 38
FIG. 39
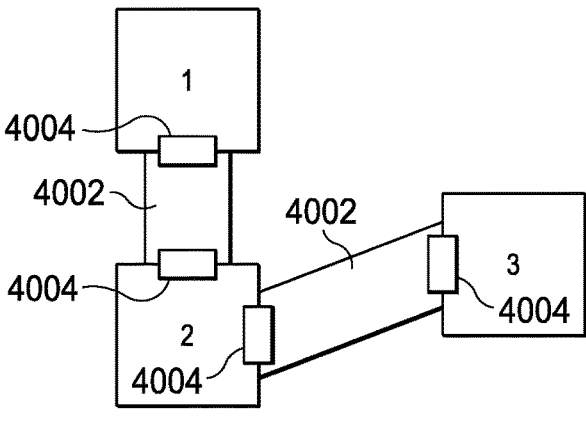
FIG. 40

SYSTEM AND METHOD FOR HAPTIC MAPPING OF A CONFIGURABLE VIRTUAL REALITY ENVIRONMENT

CROSS-REFERENCE TO RELATED APPLICATIONS

This application is a continuation-in-part of U.S. patent application Ser. No. 17/062,928, filed Oct. 5, 2020, entitled SYSTEM AND METHOD FOR HAPTIC MAPPING OF A CONFIGURABLE VIRTUAL REALITY ENVIRON-MENT, which is a continuation of U.S. patent application Ser. No. 16/355,218, filed Mar. 15, 2019, entitled SYSTEM AND METHOD FOR HAPTIC MAPPING OF A CONFIG-URABLE VIRTUAL REALITY ENVIRONMENT, now U.S. Pat. No. 10,796,492, issued on Oct. 6, 2020, which is a continuation of U.S. patent application Ser. No. 15/991, 686, filed May 29, 2018, entitled SYSTEM AND METHOD FOR HAPTIC MAPPING OF A CONFIGURABLE VIR-TUAL REALITY ENVIRONMENT, now U.S. Pat. No. 10,255,729, issued on Apr. 9, 2019, the specifications of which are incorporated by reference in their entirety.

TECHNICAL FIELD

The present invention relates to virtual reality environ-ments, and more particularly, to a method for providing a configurable virtual reality environment model that a user may interact with in conjunction with a virtual reality environment.

BACKGROUND

Virtual reality systems have been greatly increasing in popularity and usage as the ability to create virtual worlds using computer technologies have developed. Within a vir-tual reality system, a user wears some type of headset or viewing goggles which project a virtual world for the user to see. Virtual reality systems may find uses in various types of training for soldiers, police officers, firemen, etc. or within an entertainment environment such as a gaming or movie viewing system. Current virtual reality systems normally place the user in a location where the user may freely move about without physically touching anything in the real world other than the floor. Thus, if the user touches a wall or item in the virtual reality world they can see this interaction through their virtual reality (VR) headset but the user does not physically feel anything in the real world.

One manner in which the virtual-reality experience has been improved for users is the use of various types of haptic feedback. Items in a user's hand or mounted to their body may vibrate or shake in order to provide physical feedback similar to what is occurring within the virtual-reality world. Another technique has been the creation of a fixed set within the real world that in its physical configuration mimics the items that are being viewed in the virtual-reality world. Thus, for example, if the user was reaching out to touch a wall in the virtual-reality world, the user would feel a physical wall in the real world that would provide a further input such that the user did not only see themselves touching a wall but actually felt themselves doing so. The problem with creating these type of fixed per minute real world sites are that the system is limited to a single map for operating with the virtual-reality world and the requirements that the physical model be created at a fixed location that requires users to come from other locations in order to experience the VR world in this manner.

SUMMARY

The present invention, as disclosed and described herein, in one aspect thereof, comprises a system for providing a virtual reality experience includes a plurality of wall panels at a plurality of wall panel locations defining an X by Y area within the interior of the plurality of wall panels. At least one haptic feedback device associated with at least one of the plurality of wall panels provides haptic feedback to a user. A transition area is associated with the X by Y area. A virtual reality system displays a first virtual reality environment to the user within at least a portion of the X by Y area. The first virtual reality environment defines a first virtual reality pathway for the user within the X by Y area to the at least one haptic feedback device. The virtual reality system displays a second virtual reality environment different from the first virtual reality environment within at least a portion of the X by Y area. The second virtual reality path defining a second virtual pathway for the user within the X by Y area to the at least one haptic feedback device that is different from the first virtual pathway responsive to the user entering the transition area while in the first virtual reality environ-ment.

BRIEF DESCRIPTION OF THE DRAWINGS

For a more complete understanding, reference is now made to the following description taken in conjunction with the accompanying Drawings in which:

FIG. 5 illustrates a wall panel support structure of a configurable VR environment model;

FIG. 6 illustrates a base support of the wall panel of FIG. 5;

FIG. 7 illustrates a side support of the wall panel of FIG. 5;

FIG. 37 illustrates a group of three tile segments from which a virtual-reality map can be formed;

FIG. 38 illustrates a first configuration of tile segments to form a virtual-reality map;

FIG. 39 illustrates a second configuration of tile segments to form a virtual-reality map; and FIG. 40 illustrates a third configuration of tile segments interconnected using a connector interface to form a virtual-reality map.

DETAILED DESCRIPTION

Figure 1:
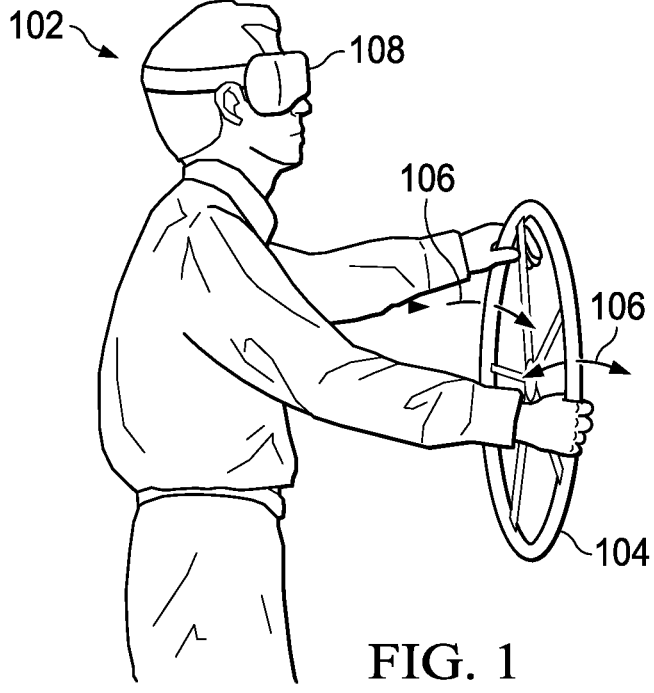
FIG. 1 illustrates a user interacting with a haptic feedback steering wheel.

Referring now to the drawings, wherein like reference numbers are used herein to designate like elements through-out, the various views and embodiments of a system and method for haptic mapping of a configurable virtual reality environment are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a first manner in which virtual-reality worlds have interacted with the real world using haptic feedback. Within a haptic feedback system, a user 102 receives physical feedback from a device that they are in contact with during the virtual-reality experience. In FIG. 1, the user 102 is holding a steering wheel 104. In order to simulate driving an actual vehicle and receive feedback through the steering wheel 104 that simulates driving a vehicle, the steering wheel 104 will shake as shown generally at 106. The shaking movement simulates the feel that a user would receive through a steering wheel 104 of an actual vehicle. The shaking 106 of the steering will 104 would be synchronized with events occurring through the virtual-reality (VR) headset 108 such that when a user 102 saw something through the headset 108, they would also feel something related to what they saw through the steering wheel 104.

Figure 2:
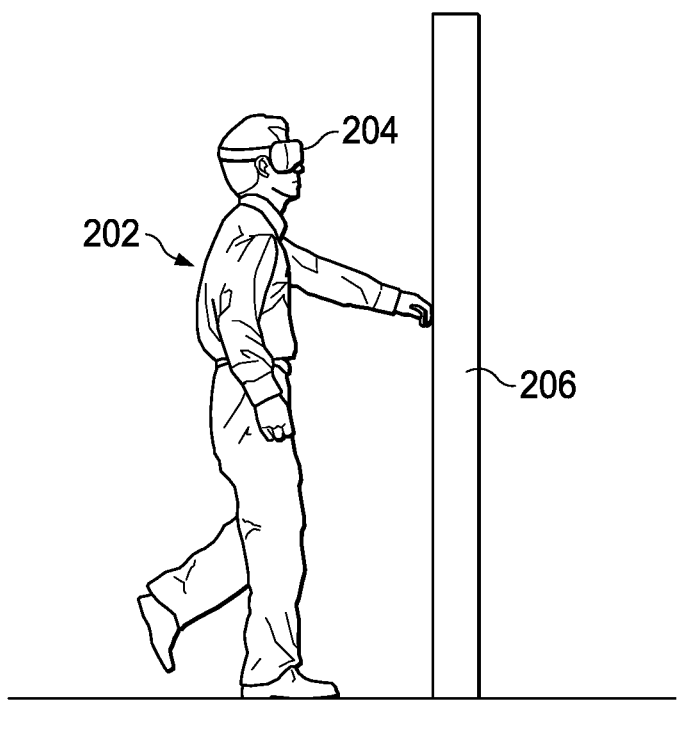
FIG. 2 illustrates a user in a VR headset physically interacting with a wall.

FIG. 2 illustrates a further manner in which a user 202 interacts with a virtual-reality environment through a headset 204. Normally, within a virtual-reality system, the user 202 sees the virtual-reality world through the headset 204. Within the actual physical world, the user 202 is placed within an open room or area so that the user will not physically touch items in the real world that would conflict with the images being presented to the user in the virtual-reality world through the headset 204. Thus, while the user 202 may see particular events through the headset 204 they do not "feel" the events they are seeing. In order to overcome this shortcoming, virtual-reality systems have been paired with a physical environment in a manner referred to as haptic mapping. Within this environment, physical elements 206 such as walls, windows, tables, doors, etc. are located within a physical area and these physical items are located at a same position as they are presented within the virtual-reality world that the user 202 is viewing through the headset 204. Thus, when the user 202 reaches out with their hand and places their hand on a wall within the virtual-reality world, the user would also feel the actual wall 206 that has been placed within the physical space surrounding the user. Thus, the user 208 would experience a more immersive experience as they would both see and feel the virtual-reality experience. These physical models generated by existing virtual-reality systems are permanently created in fixed locations that require the virtual-reality systems users to experience only a single virtual-reality model because only a single physical environment is available with which the user can interact. Overhead cameras in the physical space allow mapping of the virtual headsets to the physical world.

Figure 3:
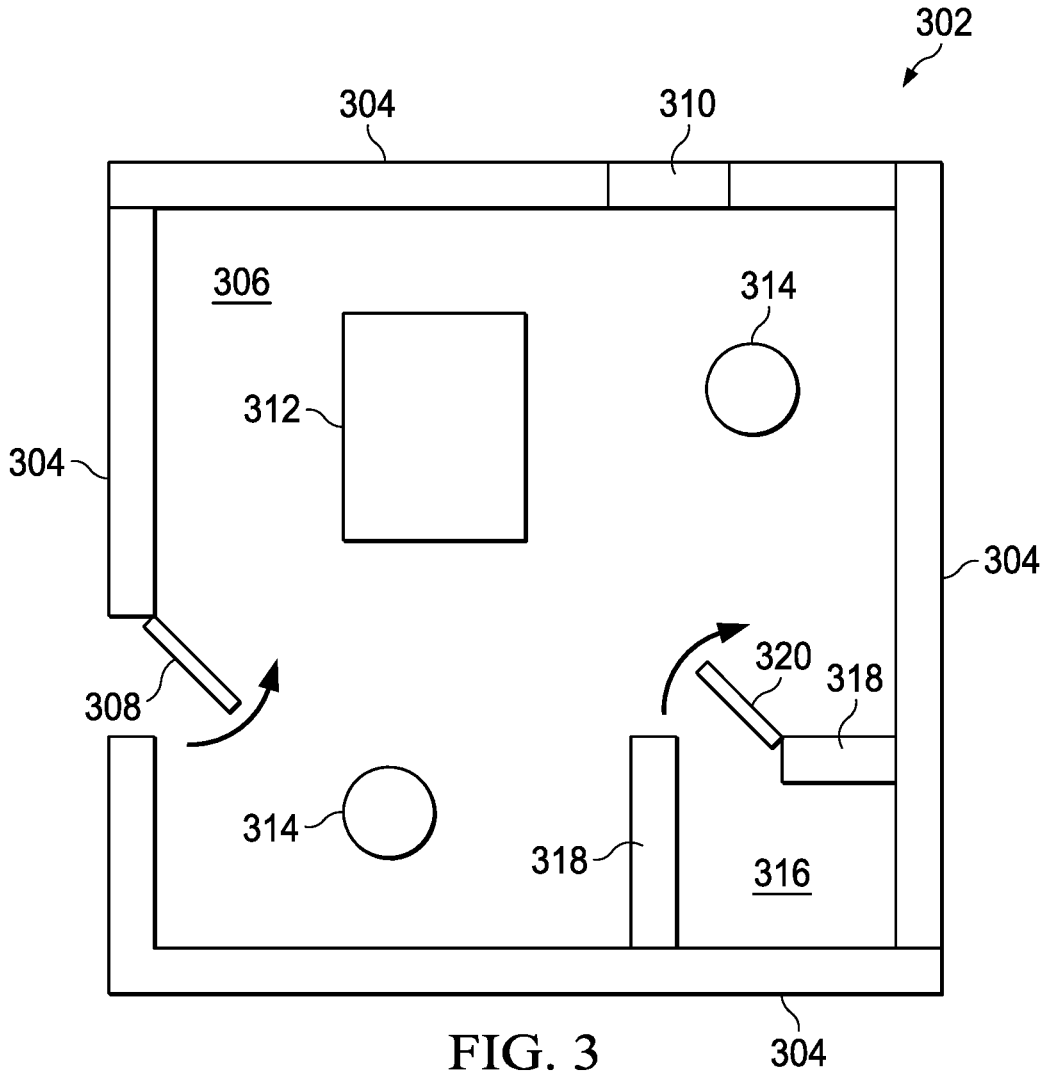
FIG. 3 illustrates a map of a physical room that may be created for a user in a VR world to interact with while interacting in the VR world.

A more detailed illustration of a configurable VR environment model 302 is illustrated in FIG. 3. A top-down view of a configurable VR environment model 302 of a room is illustrated. The room includes four walls 304 enclosing an interior area 306. One wall 304 defines a door 308 enabling entry into and exit from the interior area 306 of the room. Another wall 304 defines a window 310 which would enable the user 314 to feel a window which they were looking out of in the virtual-reality environment. The room configuration also includes a table or counter 312 within the interior area 306 that may be physically interacted with by virtual-reality users 314 that are moving about the room. Finally, a closet 316 is defined in one corner of the room via another set of walls 318. The closet 316 may be accessed via a second door 320.

Within this configurable VR environment model 302, the users 314 may move about the interior area 306 of the room. The physical structure enables the users 314 to actually touch walls 304 that they see within the VR world, pass through doors 308, 320 seen within the VR world, feel windows 310 that they are looking out of within the VR world and interact with structures such as tables or counters 312 located within the interior of the room. This provides the user 314 with a much more immersive VR experience as they are able to both see the VR world through their VR headset and feel a related item within the physical world.

In order to provide variety to the users 314, the ability to provide a configurable VR environment model 302 is nec-essary. Otherwise, the users 314 would be required to always play a same physical model that could never be changed. This would limit the entertainment factor in a gaming type environment as the user 314 would become bored with the environment after a certain number of game plays. Within a virtual-reality training environment, it is often necessary to configure an environment to a particular situation for which a group of individuals is training. If the group is only allowed train up on a single fixed physical environment, the benefits of the training are greatly limited. Thus, the ability to provide a varied environment and varied training sce-narios will provide much greater training benefits to all individuals involved.

Figure 4A:
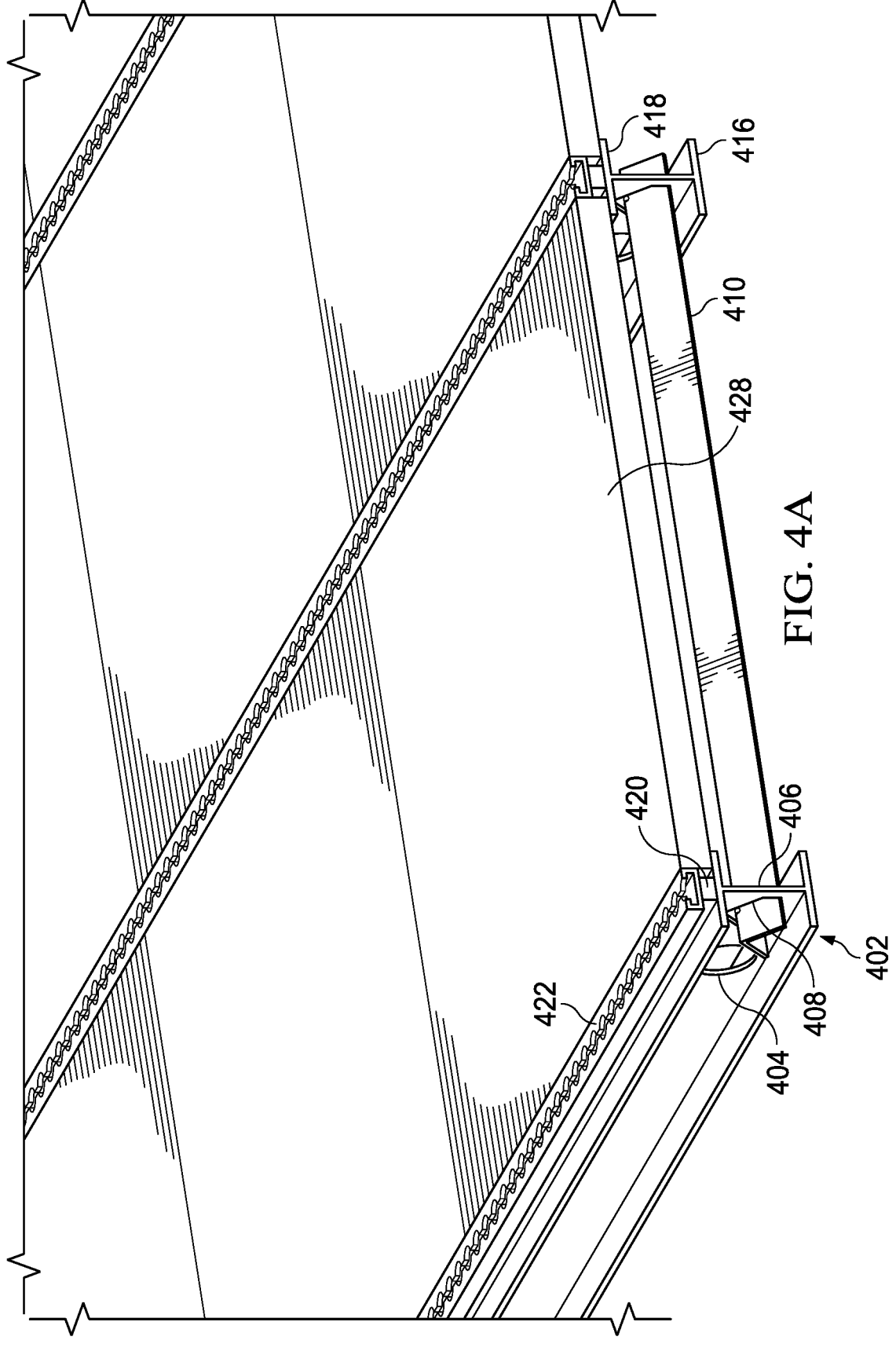
FIG. 4A illustrates a flooring system of a configurable VR environment model.

In order to provide the configurable VR environment model, the structures must provide ease of configurability between the model components. Referring now to FIG. 4A, there is illustrated the floor configuration. The floor con-figuration consists of a plurality of aluminum I-beams 402. The I-beam 402 comprises an I-shaped aluminum member that defines a plurality of holes 404 within the central portion 406. In one embodiment, the holes comprise two inch holes that are separated by 28 inch centers. The holes 404 enable for a wireless chase between sections. Thus, wires necessary for operating electronic components of the VR system and associated configurable VR environment model may run below the floor without interfering with gameplay or train-ing protocols.

Figure 4B:
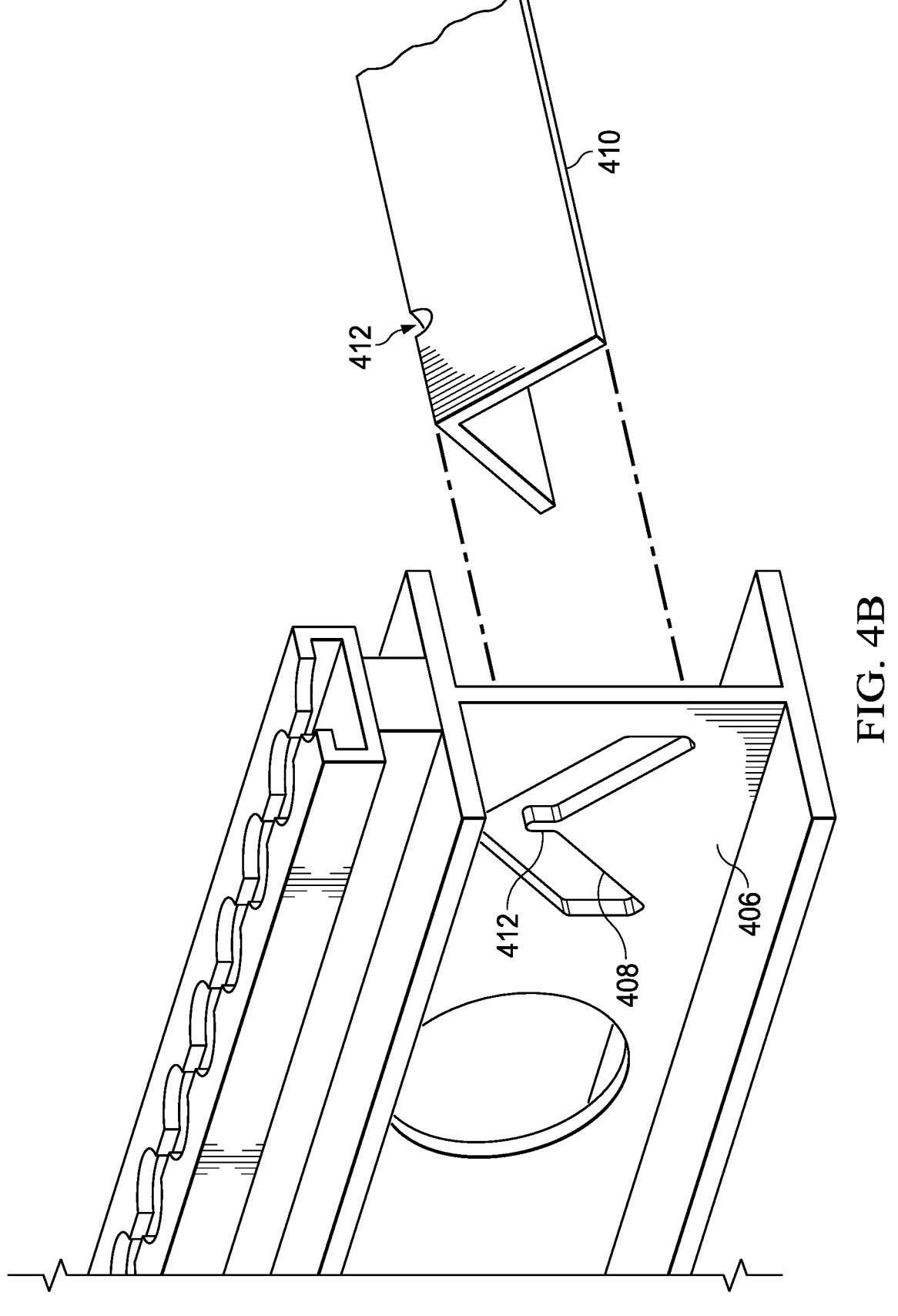
FIG. 4B illustrates the cross brace and cross brace mount-ing hole within an I-beam.

Referring now also to FIG. 4B, there is more particularly illustrated the cross brace 410 and associated cross brace slot 408. The cross brace 410 comprises an L-shaped aluminum member that includes a ¼ inch hole 412 located a distance from the end of the cross brace 410 at the connection axis of the two portions of the L-shaped cross brace. The central portion 406 of the I-beam 402 further defines a cross brace slot 408. The cross brace slot 408 defines a L-shaped opening large enough to receive the L-shaped cross brace 410. The cross brace slot 408 defines a pin 414 extending upward from the bottom angle connection point of the L-shaped slot. When the cross brace 410 is inserted into the cross brace slot 408, the pin 414 engages the hole in the cross brace slot 408. The locking pin 414 engages the hole 412 within the cross brace 410 to maintain the cross brace in a fixed position with respect to the I-beam 402. In one embodiment, the cross braces 410 maintain I-beams 402 at 24 inch centers. When multiple cross braces 410 are located in several places along the length of a pair of I-beams 402, a fixed flooring panel section is established. By tying several flooring panel sections together, a configurable VR environ-ment model floor is established.

The I-beam 402 has a base member 416 which rest on the floor. A top member 418 has an aluminum bar 420 welded thereto. In one embodiment the aluminum bar comprises a ½ inch by three-quarter inch aluminum bar with the three-quarter inch surface being welded to the top member 418. An aluminum cargo track 422 is welded to the top surface of the aluminum bar 420. The aluminum cargo track 422 comprises a rectangular member defining an opening or slot therein along the longitudinal axis thereof. The aluminum cargo track 422 is welded to the top surface of the aluminum bar 420 along the bottom surface of one of the long sides of the rectangular aluminum cargo track. The top surface of the opposite long side of the rectangular aluminum cargo track 422 defines a slot 424 along the length of the cargo track. The slot includes a plurality of cam openings 426. The cam openings 426 are large enough to receive a cam disk from the cam lock clamp which will be more fully discussed hereinbelow with respect to FIGS. 11 and 12. The cam openings 426 are set on a 2 inch center. This enables a high level of precision and granularity when placing wall panels to create configurable VR environment models on the floor sections. Once inserted through the cam openings 426, a cam disk may be moved to a narrow portion of the slot between the openings to clamp an item in place.

Flooring within the floor sections consists of one inch plywood decking 428 that is laid on top of an edge of the top members 418 of the I-beams 402 between the aluminum cargo tracks 422. The thickness of the plywood decking 428 is such that the top surface of the plywood decking will be level with the top surface of the aluminum cargo track 422. While the discussed embodiment describes the use of ply-wood decking 428, other types of decking material may be utilized for the flooring as long as the material is strong enough to support the weight of individuals walking on the decking surface and light enough to enable the reconfigu-ration of the floor paneling by a single individual.

Once the flooring sections are established within the configurable VR environment model, various wall panels may be configured on the flooring surface. Referring now to FIG. 5, there is illustrated a wall panel 502. Each wall panel 502 consists of a base member 504, two side members 506, a top member 508 and cross braces 510. The base member 504, shown also in FIG. 6, is a C-shaped aluminum beam including a base portion 604 and two side portions 606. The base portion 604 defines a plurality of elliptical slots 602. The elliptical slots 602 enable the base member 504 to be moved to a variety of positions along the longitudinal axis 608 of the C-shaped aluminum beam. The base member 504, side members 506 and top member 508 are welded together at their ends to form a rectangularly shaped wall panel 502 and the ends of cross braces 510 are welded to opposite corners of the rectangle in order to provide angular support to the wall panel structure.

Each wall panel 502 includes a pair of side members 506 that also comprise C-shaped aluminum beams as shown in FIG. 7. As with the base member 504, each side member 506 includes a base portion 702 and two side portions 704 within the C-shaped aluminum beam. The base portion 702 further defines a number of connecting slots 706 for interconnecting the wall panels 502 with adjacent wall panels or other types of vertical supporting members. The slots 706 are configured to receive a cam disk of the cam block clamp (see FIG. 11) and include an opening for inserting a cam disk and slot for receiving the cam shaft. The embodiment shown in FIGS. 5 and 7 include three connecting slots 706 for interconnecting the wall panels 502, but one skilled in the art will appreciate that additional, or fewer, slots may be utilized for interconnecting the wall panel with adjacent structures. The connecting slots 706 will be at a consistent placement with respect to adjacent wall panels 502 such that a cam lock clamp may be placed through aligned connecting slots 706 of adjacent side members 506 to enable connections therebetween.

Figure 8:
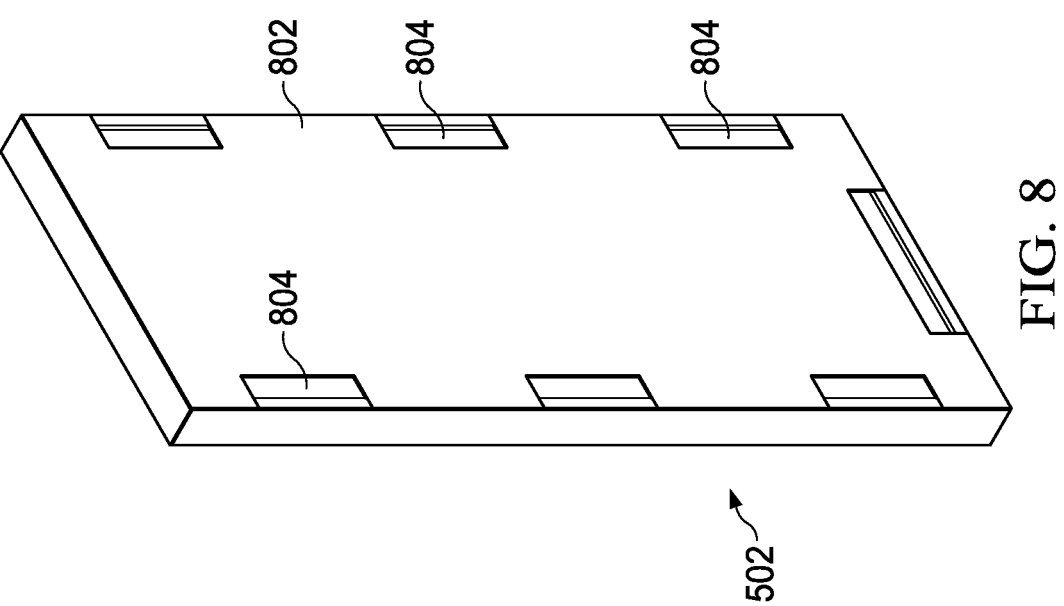
FIG. 8 illustrates a wall panel having a surface skin placed over the support structure.

As shown in FIG. 8, once the structural frame of the wall panels 502 have been created, covering panels 802 are connected to each side of the wall panel over the wall panel frame defined by the base member 504, side members 506, top member 508 and cross braces 510. The covering panel 802 defines a number of openings 804 therein. The openings 804 along the side members 506 enable for movement and positioning of the wall panel 502 when it is being moved between locations or positioned into a configurable VR environment model. An opening 804 along the bottom of the wall panel 502 near the base member 504 is used for similar purposes. The covering panels 802 additionally include a plurality of holes 806 therein forming a grid across the entire surface of the covering panel 802. The holes 806 are separated on a ¼ inch up to any size centers that will fit within the covering panel 802. The covering panels 802 are connected to the wall panel frame via connectors 805. The plurality of holes 806 enable various textures and items to be connected to the wall panel 502 or formed as an integral part thereof. Thus, by utilizing pegs on the backside of an item, the pegs may be inserted through the holes on the covering surface 802 to enable the item to be affixed to the wall. The material affixed to the wall may comprise textures such as a rock or wood wall, a window or other type of opening outline, or may be used for providing a shelf, mantle for a fireplace or any other texture which would need to be simulated within the real world to provide tactile feedback to a user in the VR world consistent with what they are viewing in the virtual world.

Figure 9:
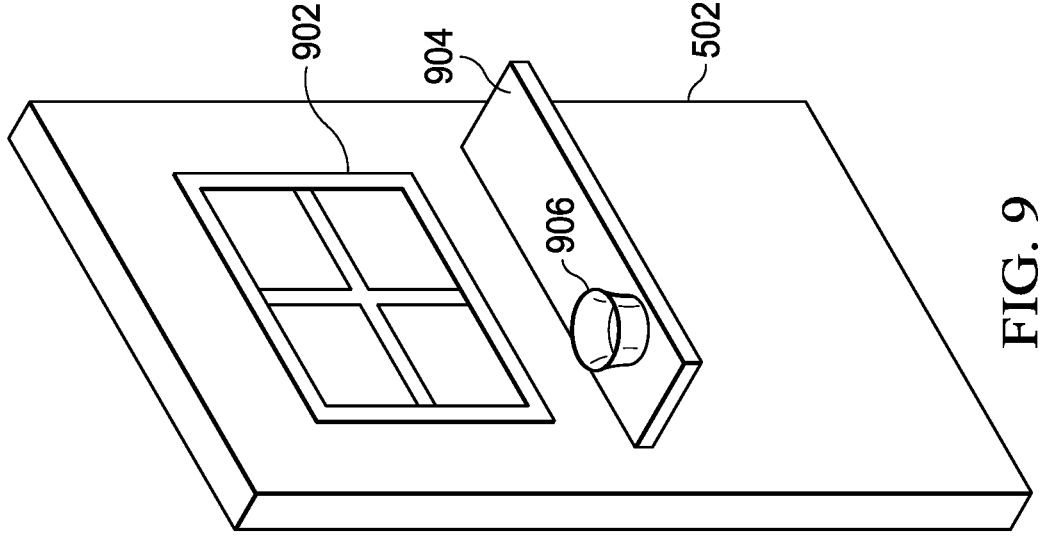
FIG. 9 illustrates a wall panel having particular textures applied thereto.

Referring now to FIG. 9, there is illustrated the manner in which textures may be inserted into the covering panel 802 using the plurality of holes 806 on the surface thereof. In FIG. 9, a window 902 has been created on the wall panel 502. The window 902 consists of a rectangular frame structure and cross pieces for creating a model of a window frame. Additionally, a shelf 904 has been inserted into the wall panel 502 to provide a surface below the window which may be touched or have items placed there on. The shelf 904 could additionally have items 906 placed there on that a user may interact with but the items 906 would need to be placed within a specific registered location of on the shelf 904 such that the item can be specifically located within the VR world being presented to the user through their VR headset. The item 906 could be registered by being placed within a specific location on the shelf 904 or alternatively, could include some type of transmitting device that enabled the system to determine a position of the item when it moves within the VR world in much the same manner that position of individuals interacting with the VR world have their position tracked.

Figure 10:
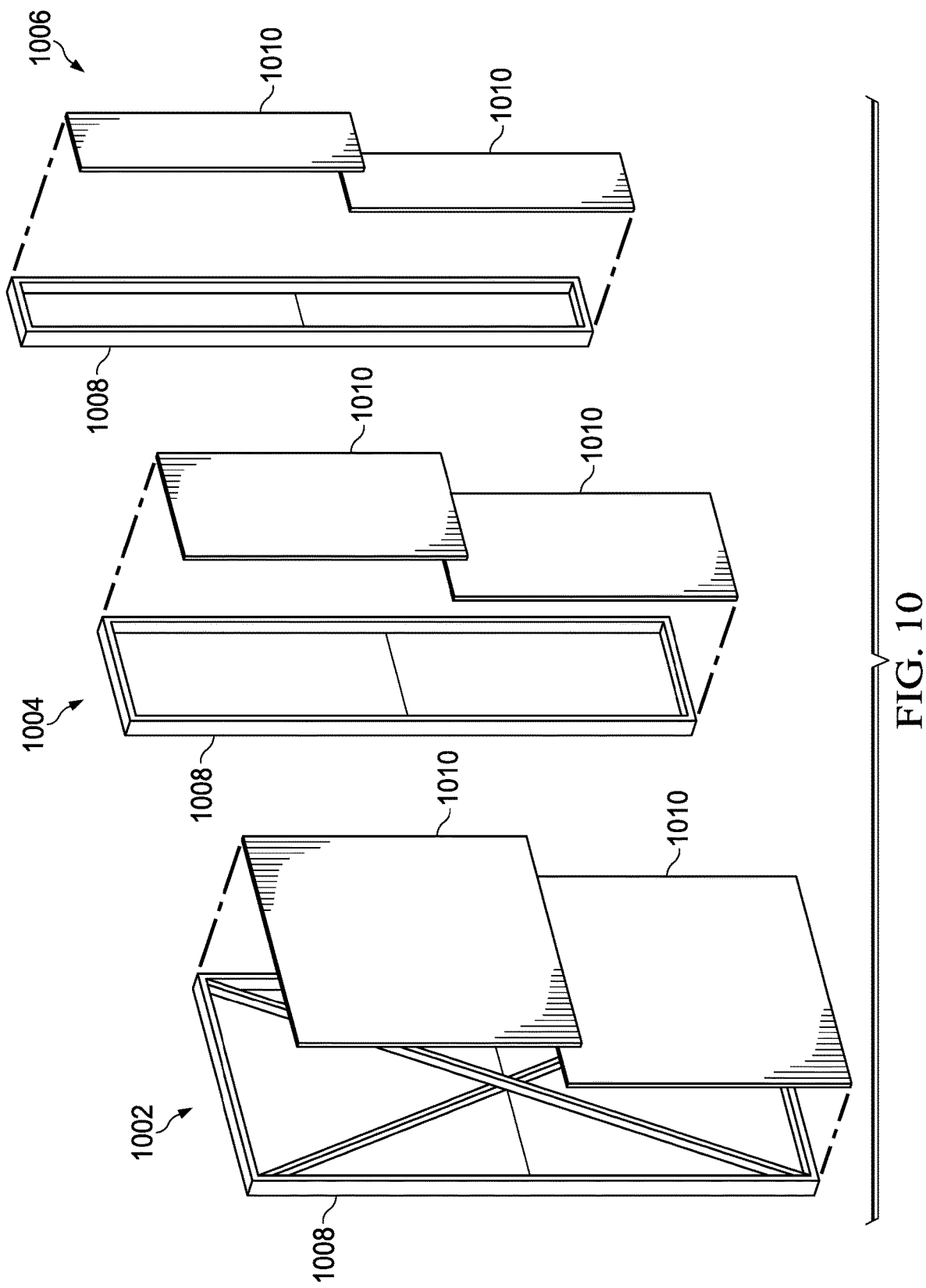
FIG. 10 illustrates various sized wall panels.

The wall panels 502 may be constructed in a variety of sizes in order to accommodate differing virtual-reality environment models as shown in FIG. 10. Wall panels 502 may be 3"×45"×96" 1002; 3"×22.5"×96" 1004; 3"×12"×96" 1006 or any other applicable size. Each of the wall panels 1002, 1004 and 1006 comprises the panel frame 1008 covered by a pair of panel coverings 1010. The covering panels 1010 comprise vacuum formed textured panels that may be quickly changed using panel quick connect fasteners 1012 to provide differing wall surface textures to suit various configurable VR environment models. The varying size wall panels enable the modeling of a variety of different configurable VR environment models for use with differing types of VR worlds.

While the above descriptions have envisioned a wall panel 502 including rigid base members 504, side members 506 and top members 508, the wall panel may also be construct did using flexible members that may be temporarily or permanently bent to a curved position. In this manner, the base member 504 and top member 508 could be curved to represent a curved representation in the configurable VR environment model such as a column, tree trunk or other curved surface. Additionally, the side members may also be flexibly bent in the vertical axis to create a curving surface such as a dome or archway rising above or away from the user in the virtual-reality environment. In this manner, curved surfaces may also be created in the configurable virtual-reality environment model rather than just being limited to planar surfaces. Alternatively, some or all of the base member 504, top member 508 and side members 506 may be constructed from rigid curved members to provide the same curved infrastructure in a more permanent form.

Figure 11:
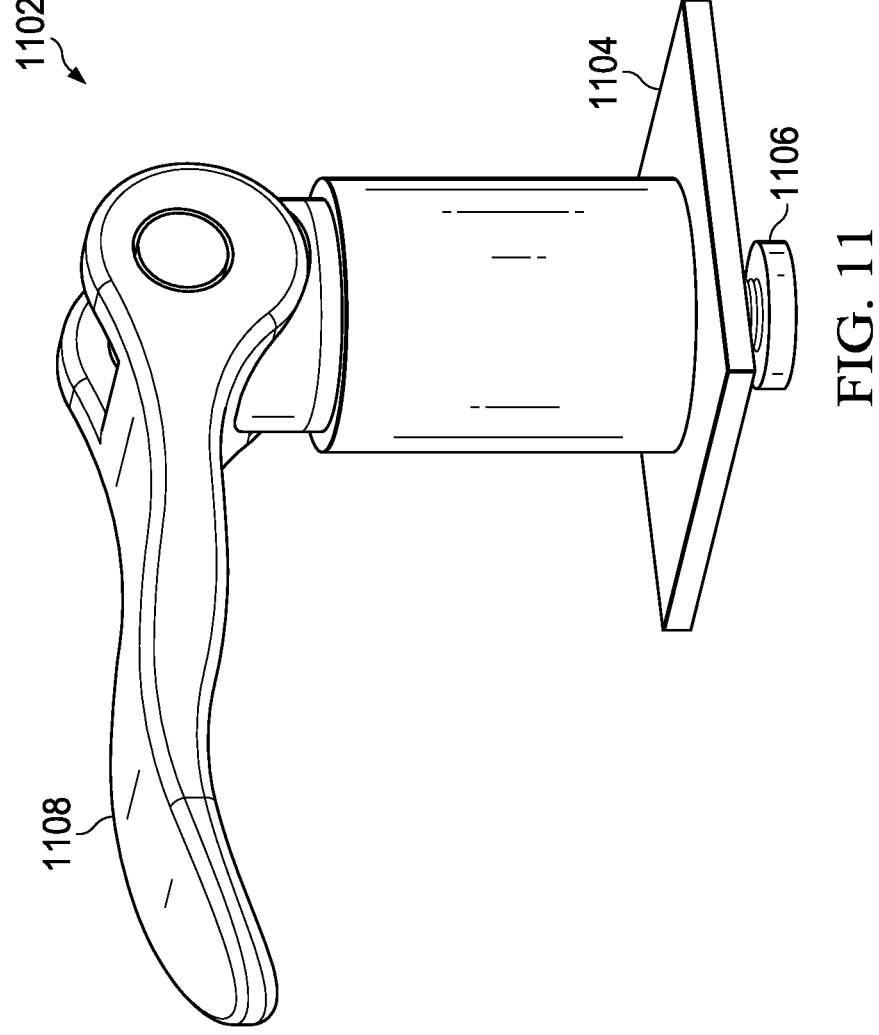
FIG. 11 illustrates a perspective view of a cam-lock clamp.

The wall panels 502 and I-beams 402 of the floor unit are interconnected using connecting clamps. Referring now to FIG. 11, there is an example of a particular embodiment of a clamp comprising a cam-lock clamp 1102. The cam-lock clamp 1102 comprises a base plate 1104 and a cam-lock disk 1106 located on a bottom side of the base plate 1104. The cam-lock disk 1106 fits through openings in for example the aluminum aircraft cargo track 422 of the I-beam 402 and the side members 506 of the wall panels 502. After being inserted through the openings, the cam-lock disk 1106 may be locked down on surfaces located between the cam-lock disk and the base plate 1104. The cam-lock disk 1106 is locked in place using a lever 1108. In the unlocked or raised position the lever 1108 surfaces may move freely between cam-lock disk 1106 and the base plate 1104. When the lever 1108 is in the locked or lowered position, the cam-lock disk 1106 and base plate 1104 will securely clamp to any surface located between the cam-lock disk and the base plate.

Figure 12:
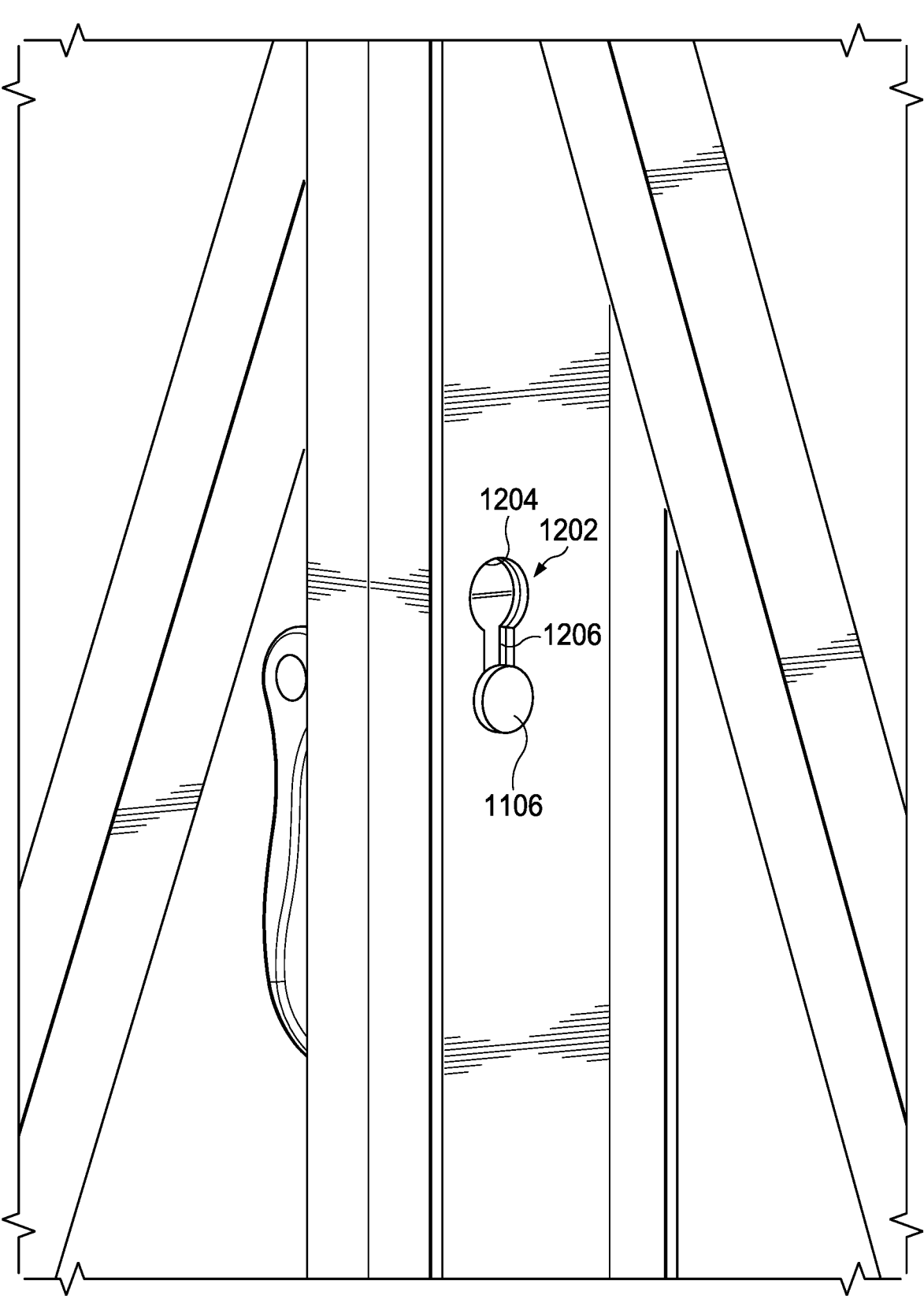
FIG. 12 illustrates a cam-lock clamp inserted within cam-lock holes in wall panels.

The manner of use of the cam-lock clamp 1102 is more fully illustrated in FIG. 12, wherein there is illustrated a cam-lock clamp 1102 inserted through locking holes 1202 of a wall panel. The locking hole 1202 includes a cam hole 1204 and slot 1206. The cam-disk 1106 of the cam-lock clamp 1102 is inserted through the cam holes 1204 of the wall panels and is lowered into the slot 1206 while the lever 1108 is in the open or unlocked position. After the clamp 1102 is moved into the slot 1206, the lever 1108 is moved to the locking position. This causes the cam disk 1106 to clamp together with the base plate 1108 and secure the side members of the wall panels together.

Figure 13:
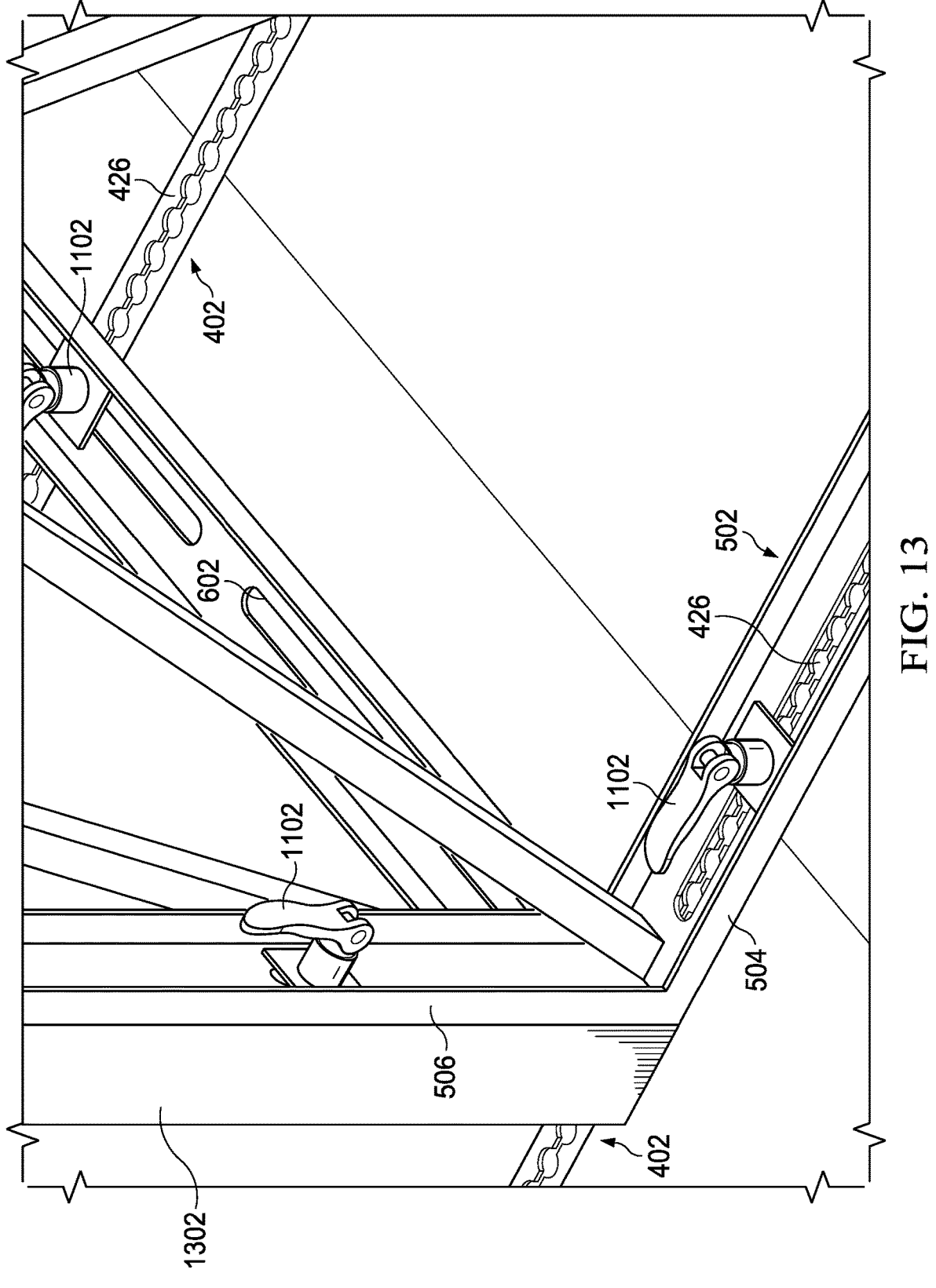
FIG. 13 illustrates the manner in which wall panels and floor panels are interconnected with each other in the configurable VR environment model.

Referring now to FIG. 13, the wall panels 502 and I-beams 402 may be interconnected with each other utilizing the cam-lock clamps 1102. The wall panels 502 are connected to the I-beams 402 by placing the slots 602 of the base member 504 of the wall panel over a particular cam opening 426 within the cargo track 422 of the I-beam 402. As discussed previously, the cam openings 426 are separated by two inch centers. This enables the wall panels 502 to be positioned in two-inch increments enabling a high level of precision in the wall panel placement. When the wall panel 502 is located in a desired location and the slot 602 is aligned with one of the cam openings 426, a cam-lock clamp 1102 is placed such that the cam-lock disk 1106 inserts through one of the cam-lock holes 426. The lever 1108 of the cam block clamp 1102 may then be moved to a lock position in a narrower portion of the cargo track 422 to clamp the base member 504 of the wall panel 502 to the floor. The base plate 1104 of the cam-lock clamp 1102 and the cam disk 1106 clamp the base member in the cargo track 422 between them to securely fasten the wall panel member 502 to the floor. The two inch centers of the cam openings 426 enable the wall panels 502 to be placed in horizontal, vertical and angled orientations with respect to the cargo tracks 422 and provide a variety of levels of configurability of the wall panels. The combination of the openings 426 within the cargo tracks 422 and the slots 602 of the base members 504 allow for a great deal of movement flexibility in the placement of the wall panels 502. The large number of openings 426 within the floor cargo tracks 422 allow the placement of the wall panels 502 at a large number of locations and in a variety of orientations with respect to the tracks. The slots 602 allow for a large degree of movement along the axis 602 of the base member to allow the wall panel placement to be finely tuned to meet the requirements of the configurable VR environment model.

The side members 506 of the wall panel 502 may interconnect with other wall panels or vertical support members 1302 as will be more fully described hereinbelow. The side members 506 interconnect with other wall panels 502 or vertical support members 1302 using the cam-lock clamps 1102. With the lever 1108 in the unlocked position, the cam-lock disk 1106 is located in a position that will pass through the openings 804 within the side members 506 or vertical support members 1302. The cam-lock member 1106 may then be moved to a position that will not pass through the opening 804 and the lever 1108 is moved to the locking position. This locks the side members 506's or vertical support member 1302 between the base plate 1104 and cam-lock member 1106 to help maintain the wall panel 502 in an upright position.

Figure 14:
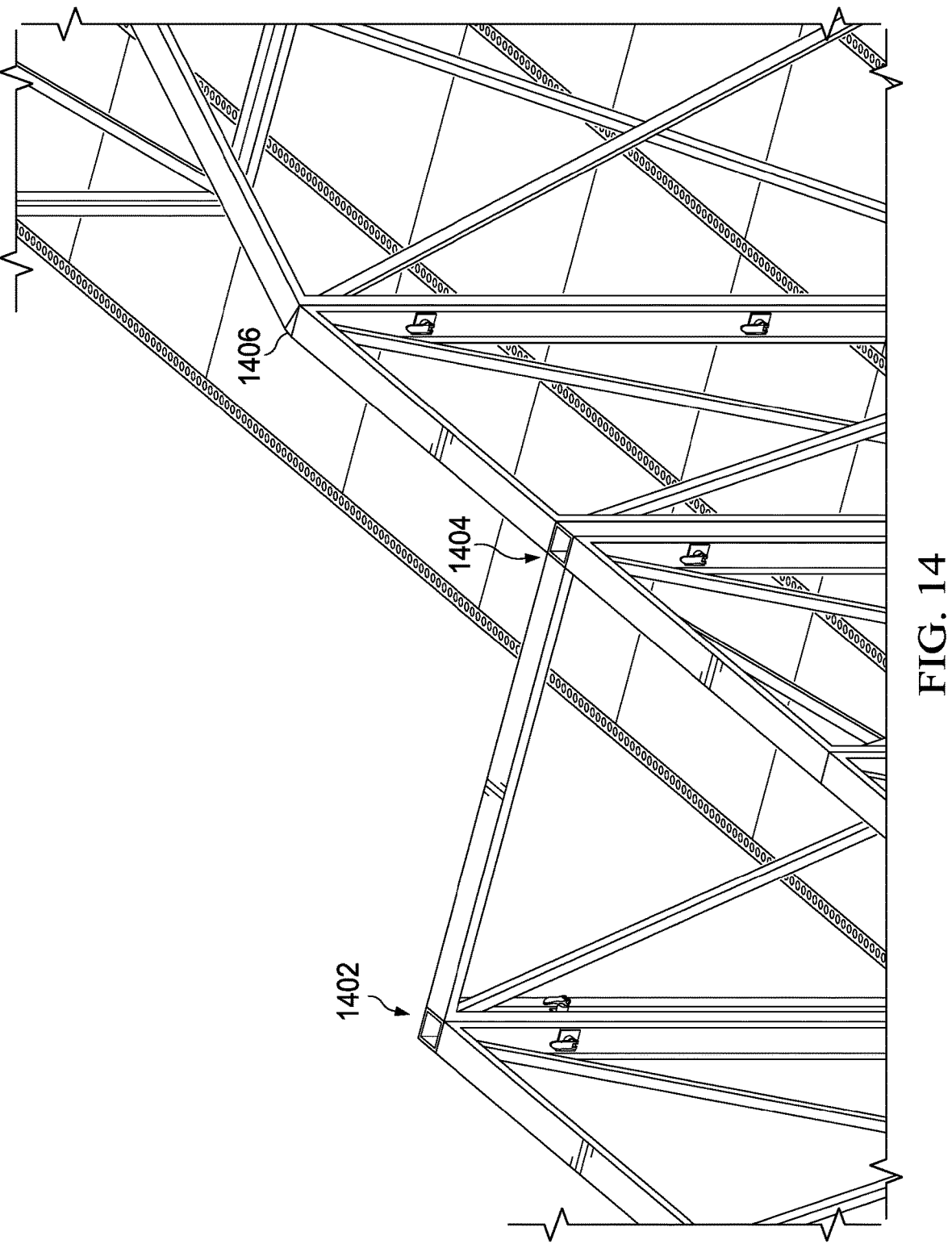
FIG. 14 illustrates various junction connections for wall panels.
Figures 15, 16A:
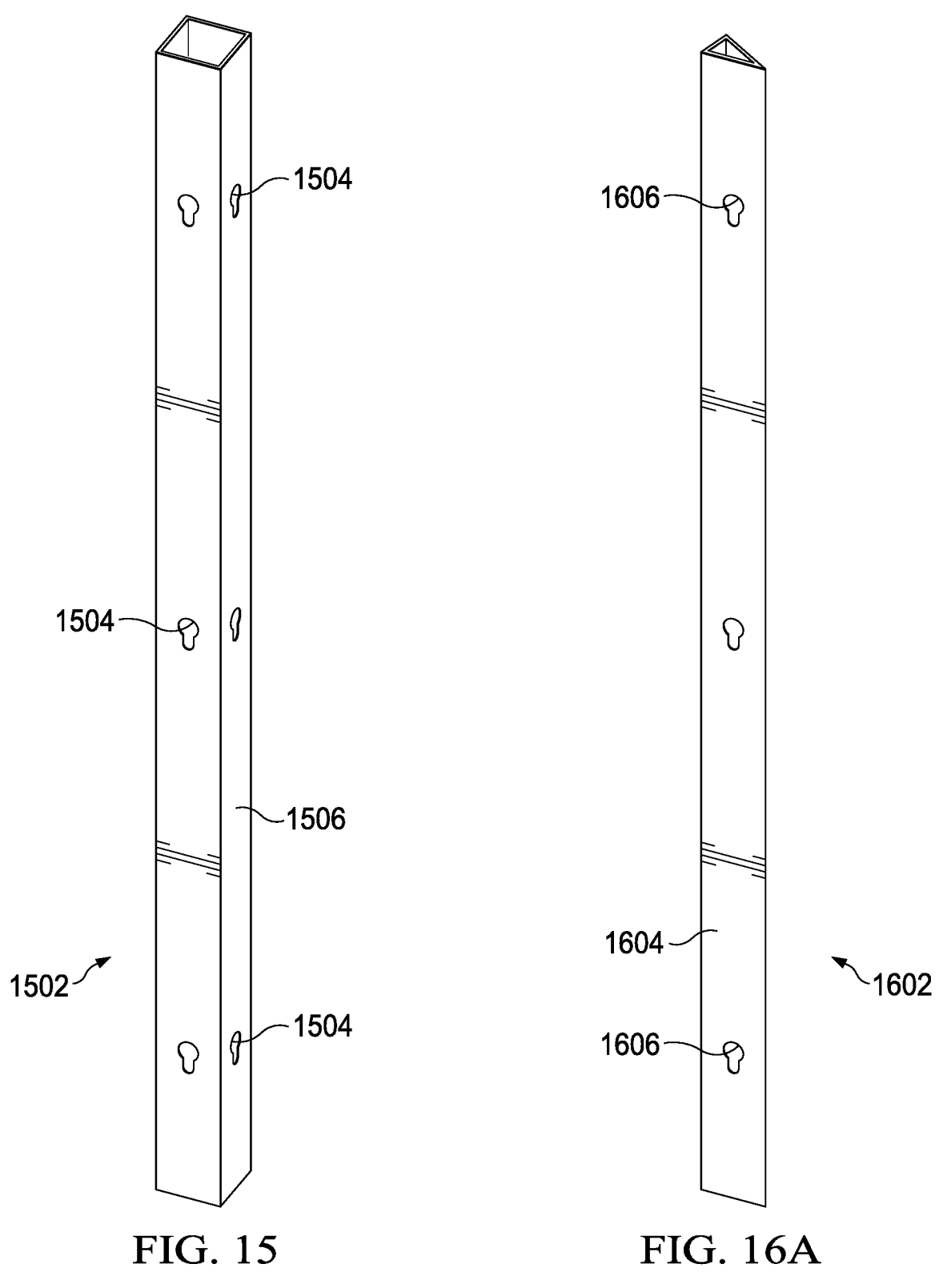
FIG. 15 illustrates a 90° support member for intercon-necting wall panels.
FIG. 16A illustrates an angled support member for inter-connecting wall panels.

Referring now to FIG. 14, there is provided more detailed information regarding the manner for interconnecting side members 506 of wall panels 502. FIG. 14 illustrates a number of interconnected wall panels 502 in a 90° connection 1402, a T-Junction connection 1404 and an angled connection 1406. The 90° connection 1402 and T-junction connections 1404 are achieved using a vertical support member 1502 as shown in FIG. 15. The vertical support member 1502 comprises a rectangular member 1506 made from aluminum tubing. Each of the four sides of the rectangular member 1506 defines multiple cam openings 1504 therein for receiving the cam disk 1106 of the cam-lock clamp 1102. The rectangular member 1506 may have a side member 506 of a wall panel 502 clamp thereto using cam-lock clamp 1102. The openings 1504 of the rectangular member 1506 are positioned to align with corresponding openings 706 of the side members 506 of the wall panel 502. Thus, by inserting the cam disk 1106 through the aligned holes 706 and 1504 placing the lever 1108 in the locking position, multiple cam-lock clamps 1102 may be used to secure wall panels 502 in a 90° connection 1402.

In a similar manner, a T-junction connection 1404 may be achieved using the vertical support member 1502. In the case of a T-junction connection 1404, the rectangular member 1506 has wall panels 502 connected to three sides thereof. As before, the holes 1504 within the vertical support member 1502 are aligned with corresponding openings 706 of a side member 506 of a wall panel 502. A cam-lock clamp 1102 is inserted through the aligned holes and locked into place to lock the wall panel in an upright position. In a similar manner to that described with respect to the T-Junction connection 1404, wall panels 502 could also be connected to each side of the vertical support member 1502 to provide a four wall panel intersection connection if needed.

An angled connection 1406 utilizes an angled vertical support member 1602 as illustrated in FIG. 16A. The angled vertical support member 1602 comprises a triangular member 1604 including three sides. Either two of the sides, or all three of the sides define openings 1606 therein. Each of the openings 1606 align with a similar opening 504 within the side member 1506 of the wall panel 502. A cam-lock clamp 1102 is inserted through the aligned holes and the lever moved to the lock position to secure the wall panel 502 with the angled vertical support member 1506. The angle provided by the angled connection 1406 of FIG. 14 comprises a 22.5° angle connection. However, angles of various other degrees may also be implemented within the angled vertical support member 1506 that are consistent with the two inch centers provided by the I-beams.

Figures 16B, 16C:
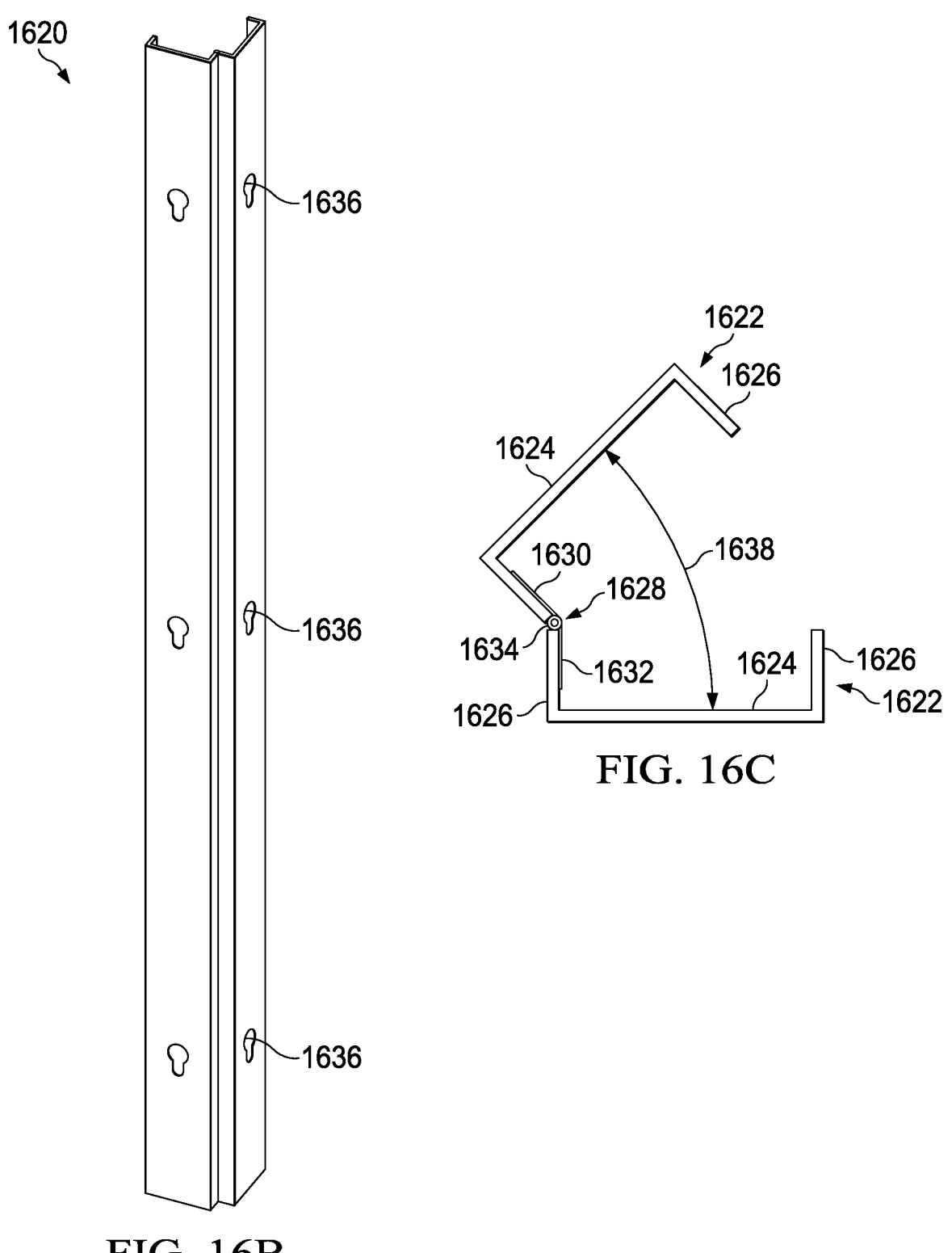
FIG. 16B illustrates a perspective view of a hinged vertical support member.
FIG. 16C illustrates an end view of the hinged vertical support member.

Referring now to FIGS. 16B and 16C there is illustrated a further manner for interconnecting wall panels 502 together. Rather than directly connecting the side members 506 together or connecting the side member to a vertical support member 1502 or angled vertical support member 1602, a hinged vertical support member 1620 may be utilized. The hinged vertical support member 1620 comprises first and second U-shaped aluminum members 1622 having a base portion 1624 and two side portions 1626 extending perpendicularly from each edge of the base portion. The U-shaped aluminum members 1622 are interconnected by a hinge mechanism 1628. The hinge mechanism 1628 comprises a first plate 1630 that connects to a side portion 1626 of a first U-shaped aluminum member 1622 and a second plate 1632 that connects to a side portion of a second U-shaped aluminum member. The first plate 1630 and second plate 1632 are connected at a rotating connection 1634.

The base portion 1624 of the U-shaped aluminum members 1622 defines a plurality of connection holes 1636 therein. The connection holes 1636 comprise the hole and slot configuration as described above with respect to the wall panel side members 506 that are placed and sized to align with the corresponding connection holes located on the side members 506 of a wall panel 502 or the vertical support members. The connection holes 1636 on the U-shaped aluminum members 1622 are aligned with the corresponding connection holes on the side panel 502 or vertical support members and interconnected with each other using a clamping mechanism 1102. Once connected, the wall panel may be moved along an axis 1638 to be placed at any desired angle between 0° and 90°. While FIGS. 16B and 16C have illustrated the use of a single hinge mechanism 1624, in alternative embodiments a separate smaller hinge mechanism may be separately located on the U-shaped aluminum members 1622 rather than using a single hinge mechanism.

Figure 17:
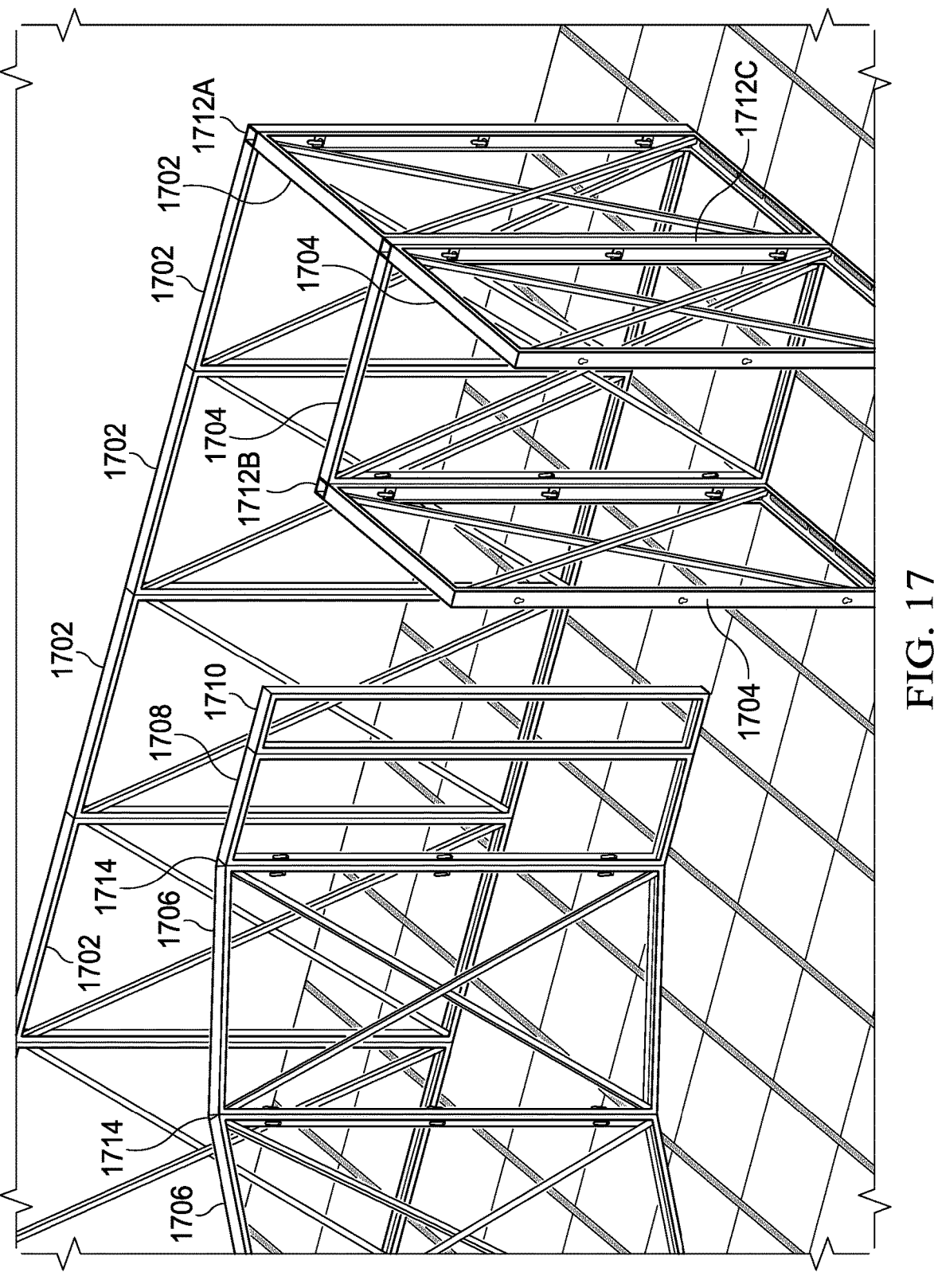
FIG. 17 illustrates an example of a configurable VR environment model constructed using wall panels and floor panels.

Using the above described components for designing a configurable VR environment model, a structure such as that provided in FIG. 17 may be provided. A structure comprising a plurality of full-size wall panels 1702 is provided that creates an exterior wall. A small closet area is defined by panels 1704. An interior wall is provided by a pair of full-size panels 1706 and a 22 and a half-inch panel 1708 and 12 inch panel 1710. Support members provide for both 90° corner connections at 1712A and 1712B and a T-junction at 1712C. Finally, 22.5° angle corners are provided at angled vertical connectors 1714. The angled corners allow for a more gradual change in direction of the wall. Once the wall panels have been erected, the coverings may be placed over the support structures in order to provide the desired wall textures.

Figure 18:
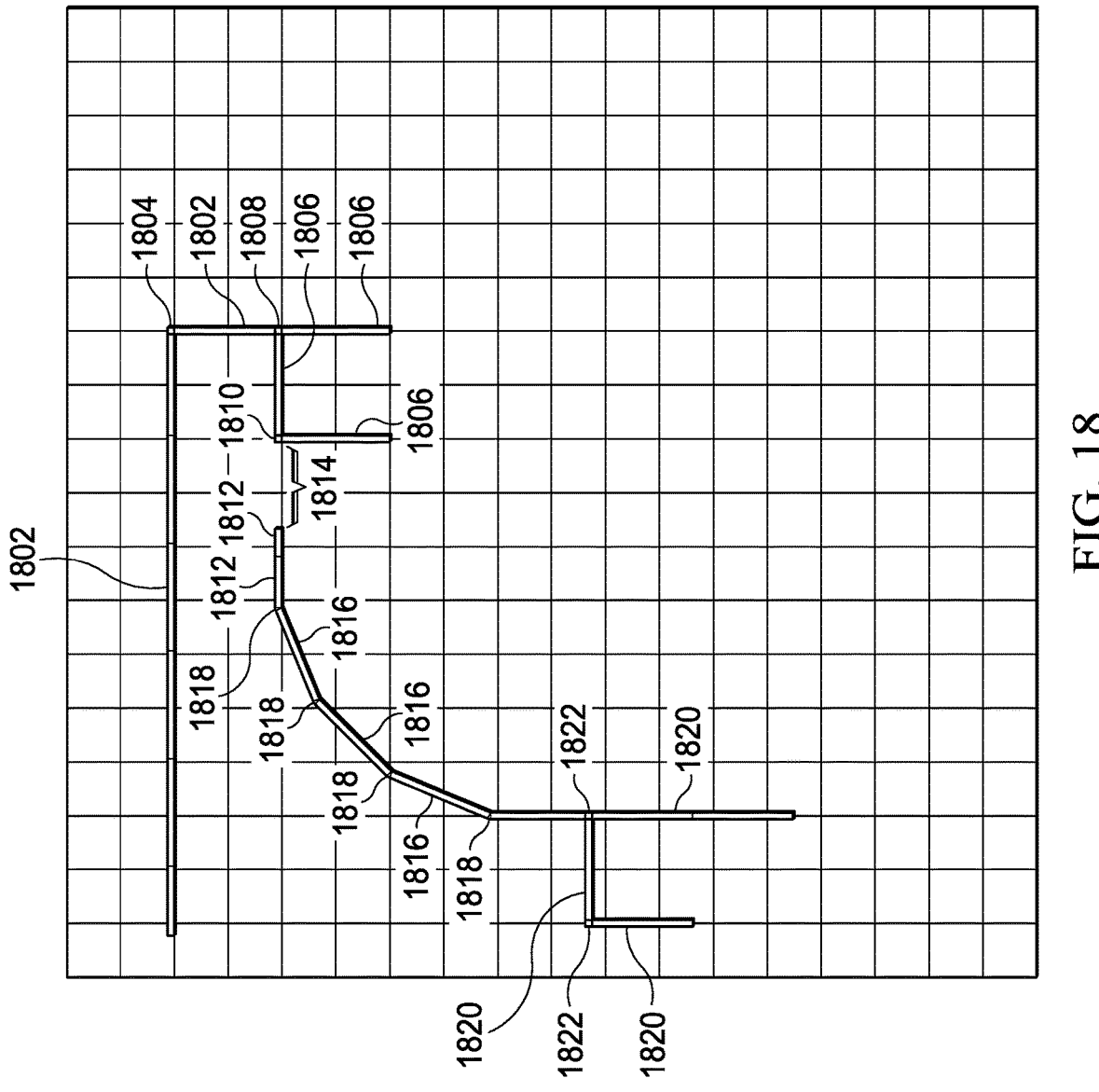
FIG. 18 illustrates a top view of a configurable VR environment model.

FIG. 18 provides a top-down view of the structure created in FIG. 17. The exterior walls 1802 are created by a series of interconnected wall panels that are connected at a 90° connection using a vertical support member at point 1804. A small closet is created by panels 1806 provided via a T-junction using a vertical connection member at point 1808 and a 90° connection using a vertical support member at point 1810. Panels 1812 comprise smaller size wall panels as described hereinabove to provide the door opening 1814. A curved wall structure is provided using a series of wall panels 1816. The panels forming the curve are interconnected via angled vertical supports at points 1818. The angled vertical supports provide a 22.5° angle between adjacent panels to provide the slowly curving/angled surface. Utilizing the slots within the base members of these wall panels and the holes within the track of the I-beams of the floor, the wall panels 1816 may be placed in a desired fashion to provide the curving wall structure. Finally, an additional closet structure is provided using panels 1820 that are interconnected via vertical connection members at points 1822.

The configurable VR environment model illustrated with respect to FIGS. 17 and 18 has the advantages of being quickly built, broken down and reconfigured by a single individual. The quick release clamping mechanisms and aluminum support structure enable the components to be easily moved by the single individual without requiring the use of large crews for building, breakdown and reconfiguration. Additionally, the design of the components does not require the use of any specialized tools for building the configurable VR environment model. The flooring sections comprised of the I-beams 402, cross braces 410 and panels 428 may be put together by hand without the need for any specialized tooling. The wall panels 502 and vertical support members may be placed and interconnected with each other using only the panels, vertical support members and clamping mechanisms. This ease of building and reconfigurability by a single individual without requirements of specialized allow for the creation of a variety of configurable VR environment models that enable the VR system to be utilized in a variety of gaming and training environments that are ever-changing and deliverable to a variety of locations.

Figure 19:
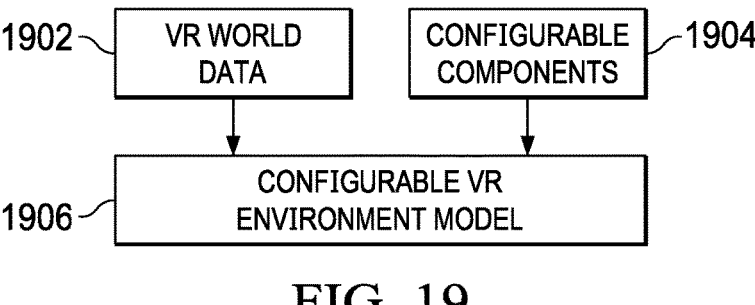
FIG. 19 illustrates the manner in which a configurable VR environment model may be generated.

The configurable components described hereinabove provide a number of benefits to enable the creation of a configurable virtual-reality environment that when paired with a virtual-reality system that displays a virtual-reality environment to a user through a VR headset provide a much more immersive user experience due to the ability to view the virtual-reality world through the headset and feel the virtual-reality world through the configurable VR environment model. The creation of the configurable VR environment model may be achieved as generally shown in FIG. 19. VR world data 1902 describing things such as locations of walls, doors, windows and other physical structures within a VR world may be paired with information regarding the configurable components 1904, such as wall panel, floor I-beam, vertical support structures, etc. described hereinabove to enable the generation of the configurable VR environment model 1906. Upon generation of the model 1906 items such as a parts list of the configurable components 1904 may be created in order to build the environment model for use by individuals.

Figure 20:
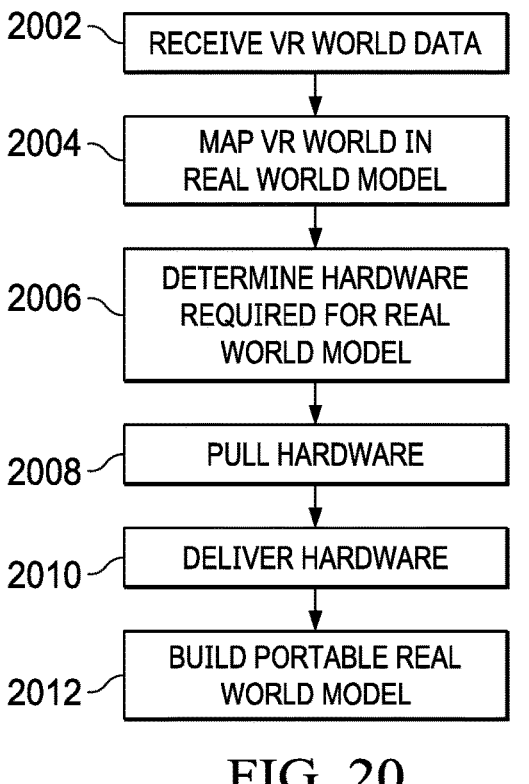
FIG. 20 illustrates a flow diagram describing the manner for creation of the configurable VR environment model.

Referring now to FIG. 20, there is illustrated a flow diagram of a process for creating the configurable VR environment model using the system described herein. Initially, at step 2002 data relating to the VR world to be modeled is received. This information may be physically delivered to a location that provides the configurable VR environment model components or this information could be downloaded via a website or some other type of network connection. This data comprises information defining the physical structures within the VR world that may have physical components modeled therefore using the described configurable components. The received VR world data is used to map at step 2004 a real world model that represents the VR world components that would the displayed to a user through a VR headset. The hardware necessary to create the real world model is determined at step 2006. This process would involve the determination of the wall panels 502, I-beams 402, vertical support members 1502, angled vertical support members 1602 and wall panel coverings 1010 necessary for building the configurable VR environment model that has been generated responsive to the provided VR data. The determined hardware components are pulled at step 2008 to enable the building of the configurable VR environment model. The pulled hardware and instructions for building the generated configurable VR environment model are delivered to a location in which the VR system and model are to be configured. This can comprise a business location, remote location or any other physical site having sufficient area for setting up the configurable VR environment model. The configurable real world environment model is built at step 2012 to provide the physical aspect to the virtual-reality world environment presented to users through, for example, some type of VR headset.

Figure 21:
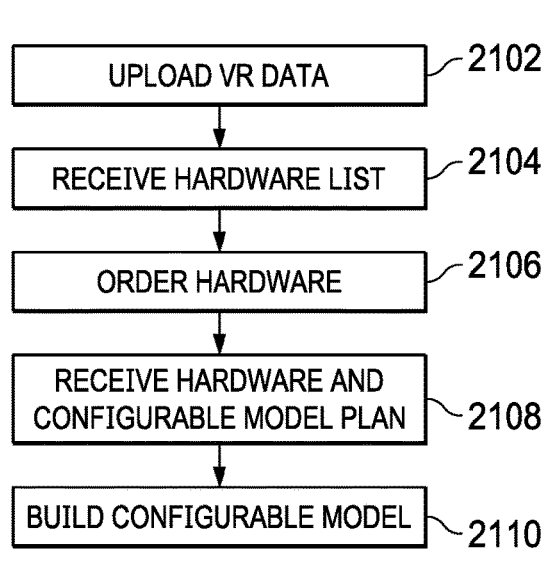
FIG. 21 illustrates a flow diagram describing the manner in which a customer would order a configurable VR environment model.

FIG. 21 is a flow diagram describing the process from the viewpoint of a customer that would be ordering the configurable VR environment model for installation at a location of their choosing. The customer initially uploads their virtual-reality data describing the world they wish to create a physical model for at step 2102. Responsive to the provided VR data using the procedure more fully described respect to FIG. 20, the information necessary to generate the configurable VR environment model is generated and provided back to the customer such that the hardware list and associated instructions for the model are received by the customer at step 2104. The customer reviews the list and model and if desiring to continue, proceeds to order the necessary hardware for building the configurable VR model at step 2106. The customer receives the can hardware and configurable model plan at step 2108 responsive to their order that enables them to build the configurable VR environment model at step 2110 in accordance with the provided plan using the provided hardware components.

Figure 22:
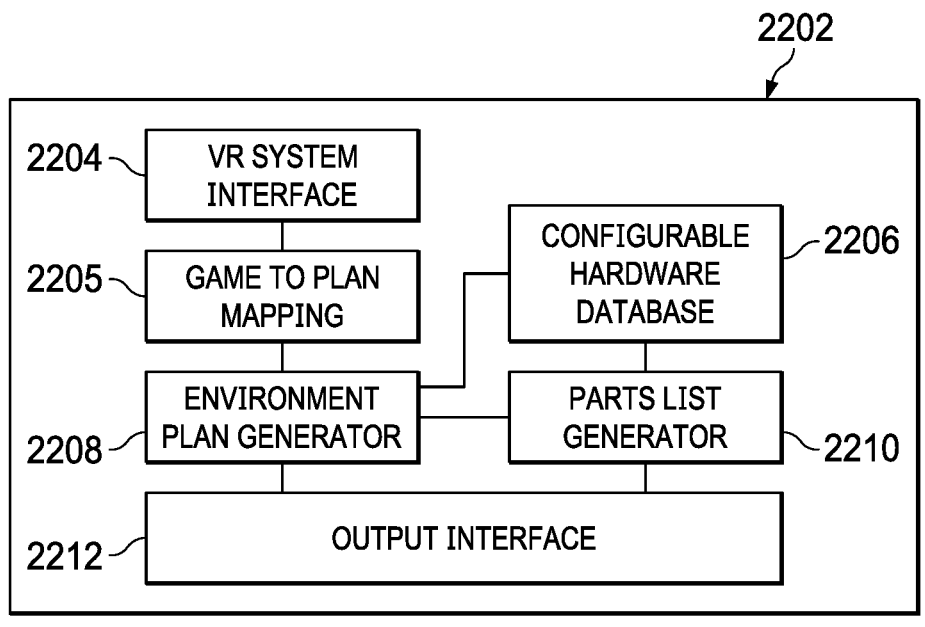
FIG. 22 illustrates a system for generating a plan and parts list for a configurable VR environment model responsive to provided VR world data.

Referring now to FIG. 22, there is illustrated a functional block diagram of a system for generating a VR environment model plan and parts list in accordance with the system described hereinabove with respect to FIGS. 20 and 21. The VR environment model plan generation system 2202 includes a VR system interface 2204 that provides a connection to receive virtual-reality world implementation data from a VR system. This data would provide information relating to structures such as walls, doors, windows, etc. within the virtual-reality world for which a configurable VR environment model must be created. The VR data downloaded from the VR system is mapped from the virtual reality word to the real world using the Game to Plan Mapping functionality 2205. The Game to Plan Mapping functionality takes the VR world information and maps it to an implementation in the physical world. Thus the mapping functionality would determine that a physical wall was located at a particular point, that a door was located a predetermined distance from one end of the wall, that a second wall is located a predetermined number of feet from this wall, etc. The mapping functionality 2205 would generate sufficient indexing and reference points between all of the structures within the VR world such that the same structures can be described within the physical world. This process can be accomplished for any gaming environment, VR or otherwise. A configurable hardware database 2206 provides data with respect to all of the available components for building a configurable VR environment model. The database 2206 would include information on the wall panels, I-beams, sensors, tactile feedback devices and other type of components which are available for use in the building of the configurable VR environment model. Various ones of these components have been discussed hereinabove, however it should be realized that other types of components may be utilized.

A configurable VR environment plan generator 2208 utilizes information provided from the Game to Plan Mapping functionality relating to the physical mapping of the virtual-reality environment to the physical world and the available hardware components from the configurable hardware database 2206 to generate a plan for a configurable virtual-reality environment model. The plan would illustrate the placement of floor section components, wall panels, vertical member supports, angled vertical supports and other physical components that provide a physical model of the virtual-reality world illustrated in the virtual-reality data that has been provided. The plan will illustrate the placement of these real-world components such that user may receive tactile response when touching a wall that has been placed in a physical location to correspond to a wall projected to the user through the virtual-reality system. The plan would designate the particular components to be utilized in constructing the model and illustrate their placement with respect to other components in the model. This would enable an individual to easily construct the designated configurable VR environment model.

The parts list generator 2210 utilizes information from the generated VR environment plan provided by the environment plan generator 2208 and the available hardware components from the database 2206 to generate a complete parts list. The parts list would comprise a list of wall panels and their associated sizes, the number of I-beams and cross braces, the number of panel coverings of particular textures and other available components that would be necessary for constructing the configurable virtual-reality environment model according to the plan generated by the plan generator 2208. The parts list would list the number of items grouped by type and provide the necessary number of components for implementing the plan. The parts list provided by the parts list generator 2210 enables an individual constructing a configurable VR environment model to confirm that they had the components necessary for constructing the model, or enable the company providing the components to have a list to work from for pulling the hardware that is to be provided to a customer for the construction of a particular VR environment model. The model plan generated by the environment plan generator 2208 in the parts list generator 2210 may be provided for use by an individual through an output interface 2212. The output interface 2212 may connect to a display, printer, network connection, etc. depending upon the manner in which the data that has been generated is to be utilized.

Figure 23:
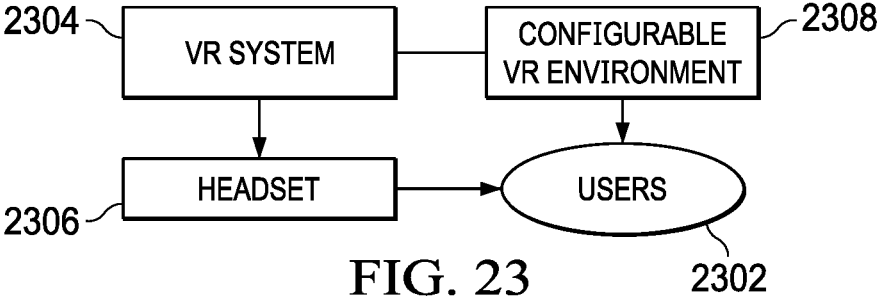
FIG. 23 illustrates the manner in which a VR system and a configurable VR environment model interact with a user.

Referring now to FIG. 23, there is illustrated the manner in which the above systems interact with each other to provide a more immersive virtual-reality experience to users 2302. A VR system 2304 generates a VR world that is projected as images to a headset 2306. The visual VR world projected to the headset 2306 from the VR system 2304 enables the user 2302 to visually discern the virtual-reality world elements that are being projected into the headset. Combined with the visual data provided to the user 2302 through the headset 2306, the configurable VR environment model 2308 may be interacted with by the user 2302. The configurable VR environment model 2308 allows the user 2302 to physically touch the structures that are visually discerned within the headset 2306 to provide a more immersive virtual-reality experience. The configurable VR environment model 2308 is constructed based upon data provided from the VR system 2304 that enables the placement of the physical structures in a manner that will correspond with the user interactions within the virtual-reality world displayed within the headset 2306. Thus, the user can both touch and see the virtual-reality world that is being experienced.

Figure 24:
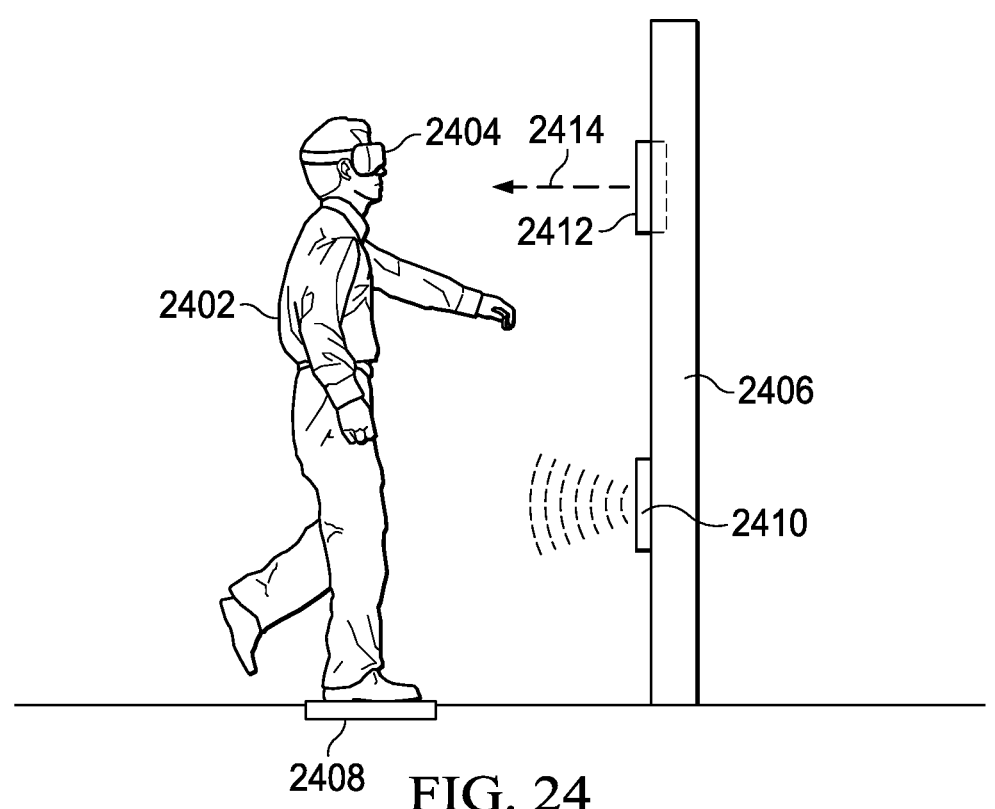
FIG. 24 illustrates a further embodiment for implementing sensors and physical world interactions with a user in the configurable VR environment model.

In addition to providing the physical structures such as floors, walls, doors and windows that a user may tactilely interact with in the configurable VR environment model, further feedback may be provided to a user using a combination of sensors and physical feedback as shown in FIG. 24. A user 2402 wearing a virtual-reality headset 2404 approaches a structure of the configurable VR environment model such as a wall 2406. Sensors detect the user 2402 as they approach the 2406. The sensors may take the form of a floor mounted pressure sensor 2408 that is actuated when a user physically stands upon the pressure sensor or, alternatively, a proximity sensor 2410 may detect the presence of the user 2402 as they approach a structure such as a wall 2406. The proximity sensor 2410 may utilize RF or optical feedback signals for detecting the presence of the user 2402. The pressure sensor 2408 or proximity sensor 2410 upon detection of an approaching user 2402 provides an actuation signal to an environmental feedback device 2412. Upon receipt of the actuation signal, the environmental feedback device 2412 will provide an environmental output 2414 that interacts with the user 2402. The environmental feedback device 2412 may comprise any number of devices such as a fan for blowing air on the user 2402, a heat lamp for projecting heat waves toward the user, a spray bottle for squirting a liquid on the user or any other similar type devices.

In this manner, the user 2402 is able to experience a simulated environmental interaction caused by approaching a particular structure. Thus, if the user 2402 was approaching a window the sensors 2408, 2410 could detect the user's presence and turn on a fan that blows air on the user simulating a breeze coming through the window. Alternatively, if the user were approaching a fire in the VR world, the sensors 2408, 2410 connecting the proximity of the user could turn on a heat lamp to cause the user to experience the heat from the fire. Similarly, the spray bottle could be used for spraying water on a user who was near an opening during a rainstorm or running water that might splash onto the user based upon their position within the virtual-reality world. The combination of sensors and environmental feedback devices 2412 further improve the immersive experience of the user within the virtual-reality. The sensors 2408, 2410 may also be used to control the environmental feedback devices 2412 to provide other types of feedback such as making a wall panel feel warm or cold to the touch to better reflect the information being provided through the VR headset 2404.

Figure 25:
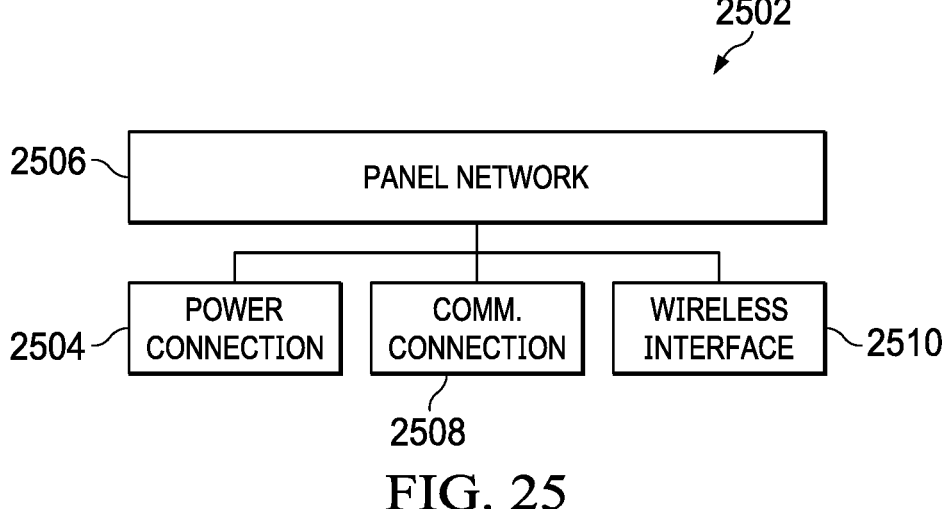
FIG. 25 illustrates a wall panel with a control system interface.

The individual wall panels 502, as described hereinabove, may be configured to include sensors and other environmental feedback components to provide an improved virtual-reality experience to the user interacting with a wall panels. As shown in FIG. 25, each of the wall panels 502 can include an interface 2502 enabling interconnect ability of the wall panel with a centralized control system. A power connection 2504 provides a standard power connection to provide electrical power to all electrical and electronic components interconnected with a panel network 2506. The power connection 2504 may be used to provide power to sensors 2410 or environmental feedback components 2412 such as those described with respect to FIG. 24 that are implemented within the wall panel 502. The interface 2502 may further include a communications interface 2508 that allows for wired connection to a standard communications interface such as an RJ-45 connector such that electronic opponents within panel network 2506 of the wall panel 502 may be addressed from an external controller through the communications interface. In addition to, or alternatively a wireless interface 2510 may be utilized to provide communications between the panel network 2506 and an external system controller. The wireless interface 2510 may implement any wireless communications protocol such as Wi-Fi.

Figure 26:
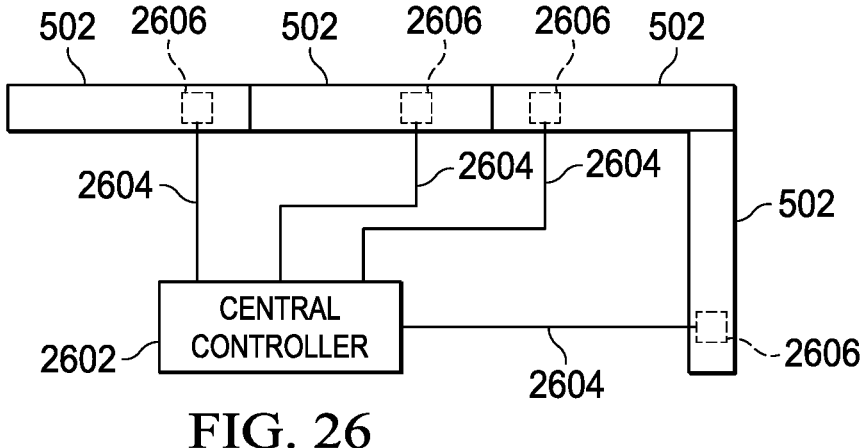
FIG. 26 illustrates a wall panel having communications links with other components.

Referring now also to FIG. 26, there is illustrated the manner in which a central controller 2602 may have individual communication links 2604 with wall panels 502. Each of the wall panels 502 would include one or more Internet accessible components 2606. These Internet accessible components 2606 could comprise individual devices such as sensors or environmental feedback devices such as those described earlier or some type of central control device associated with the panel network 2506 implemented on a particular panel 502. This would provide an Internet of things (IOT) type of communication between the central controller 2602 and the Internet accessible devices 2606. The communication links 2604 may comprise either wired or wireless communication links between the central controller 2602 and the Internet capable devices 2606. This configuration enables the central controller 26 a two communicate with particular Internet accessible components 2606 within the configurable VR model responsive to positioning of a user within the system. Thus, if a user was determined to be close to a Internet accessible device 2606 comprising a fan, the central controller 2606 could turn on the fan to blow a breeze on to the user as they were shown walking past a window or doorway within the VR world. This would allow control of various tactile feedback components within the configurable VR environment based upon the determined user positioning that did not necessarily rely upon sensors as described with respect to FIG. 24. Each of the Internet accessible components 2606 would be independently addressable items that may be individually and specifically contacted by the central controller 2602.

Figure 27:
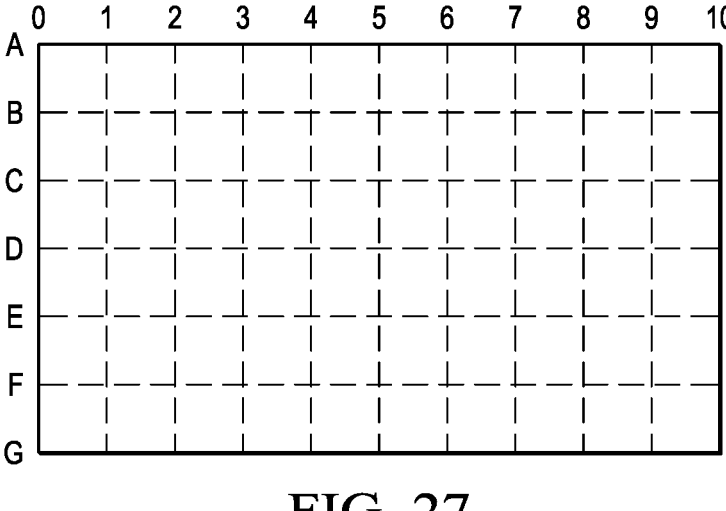
FIG. 27 illustrates a flooring portion with an associated registration grid.

Referring now also to FIG. 27, there is illustrated a flooring portion 2702 of a configurable VR environment model that has been constructed for a particular VR world. The flooring portion 2702 is divided in to a grid consisting of predetermined size squares that provide a map of the floor portion 2702. Each line of the grid is associated with identifiers A through G along one axis and identifiers 0 through 10 on a second perpendicular axis. The identifiers may comprise any component as long as they uniquely identify a physical location within the floor portion 2702. The grid may be based upon particular locations within the cargo tracks 422. In this manner, when a wall panel 520 is placed upon the floor portion 2702 the corners of the base members of the wall panels may be registered according to a grid location that the wall panel corner is most closely located. In this manner, each wall panel 502 within the configurable VR environment model may have a registered physical location associated there with, and a addressable network location associated there with that may be accessed via the central controller 2602. This provides a unique and specific mapping between the physical components of the configurable VR environment model in the visual elements provided in the virtual-reality world.

Utilizing the described system, a configurable physical VR environment model may be quickly assembled by an individual providing a VR environment to a user for gaming or training purposes. Due to the configurable nature of the VR environment model, the game or training process can be changed to reflect new parameters and not be limited to one implementation. This provides a great deal more of flexibility that is much more entertaining within the gaming environment and much more instructive with respect to the training environment.

Figures 28, 29:
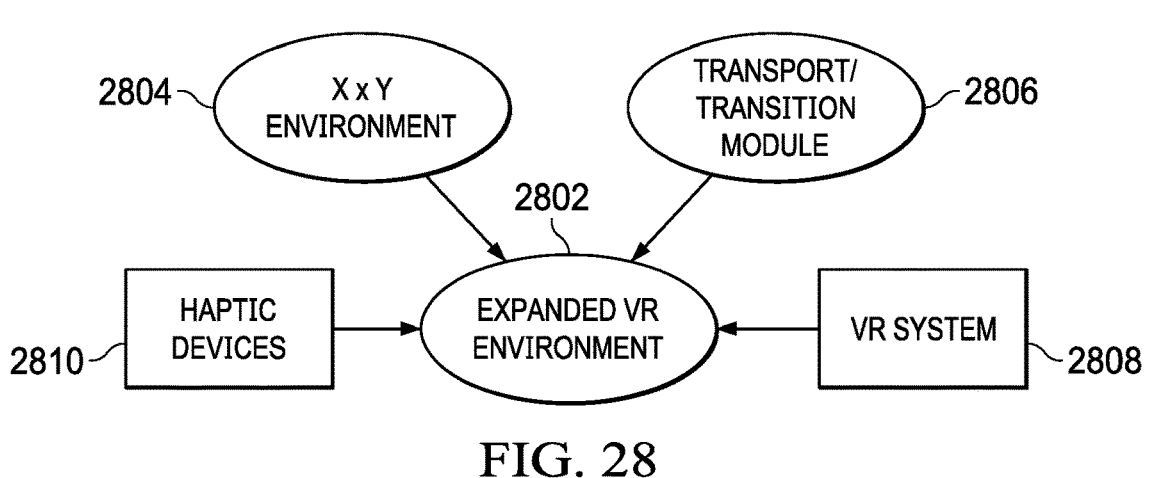
FIG. 28 illustrates a manner for expanding a virtual reality (VR) environment using a defined X by Y playing environment, transport/transition module and a VR system.
FIG. 29 illustrates the X by Y play environment including an external transport/transition module.

Referring now to FIG. 28, there is illustrated a manner for creating an expanded VR environment 2802 utilizing a combination of a physical X by Y environment 2804, a transport/transition module 2806 and a VR system 2808. The physical X by Y environment 2804 creates an area consisting of floor panels defining the X by Y virtual reality (VR) area and wall panels that are placed around the edges of the X by Y area defined by the floor panels. The floor panels and wall panels used to create the physical X by Y area may comprise those panels configured as described hereinabove or any other floor and wall panel configurations enabling construction of the physical X by Y area. As will be described in more detail hereinbelow, the physical X by Y area defined by the wall panels in the floor panels facilitate indexing for the VR system 2808. It should be understood that, once an individual is in a VR world, any physical barriers are not visible to them.

The transport/transition module 2806 provides an area either external to the X by Y area 2804 or within the X by Y area that may be used to give the VR user an impression within the virtual reality environment that they have moved from one location to another location or from one area to another area. The transport/transition module 2806 may appear within the VR world to comprise an elevator, aircraft, etc. that appears to move the VR user between the areas/locations. The VR system 2808 generates the VR world for display to a user through a headset, goggles, glasses etc. that enables the VR user to view and hear the virtual reality environment. The VR system 2808 utilizes the physical X by Y environment 2804 to move the VR user through the virtual reality world to various haptic feedback devices 2810. The haptic feedback devices 2810 may be reused multiple times within the virtual reality environment in order to provide the user the expanded VR environment 2802. This is achieved by the VR system 2808 providing multiple VR environments to the VR user within the physical X by Y environment 2804. Each of the multiple VR environments will define different pathways to a same haptic device 2810 in order to provide the VR user with the illusion of interacting with different haptic devices 2810 within different VR environments even though the same devices are being repeatedly used. The multiple uses of the haptic devices 2810 within the multiple VR environments presented within the fixed physical X by Y environment 2804 provides the user with the illusion of the expanded VR environment 2802. These multiple VR environments presented within the physical X by Y environment is achieved by the VR movement using the transport/transition module 2806.

Figure 30A:
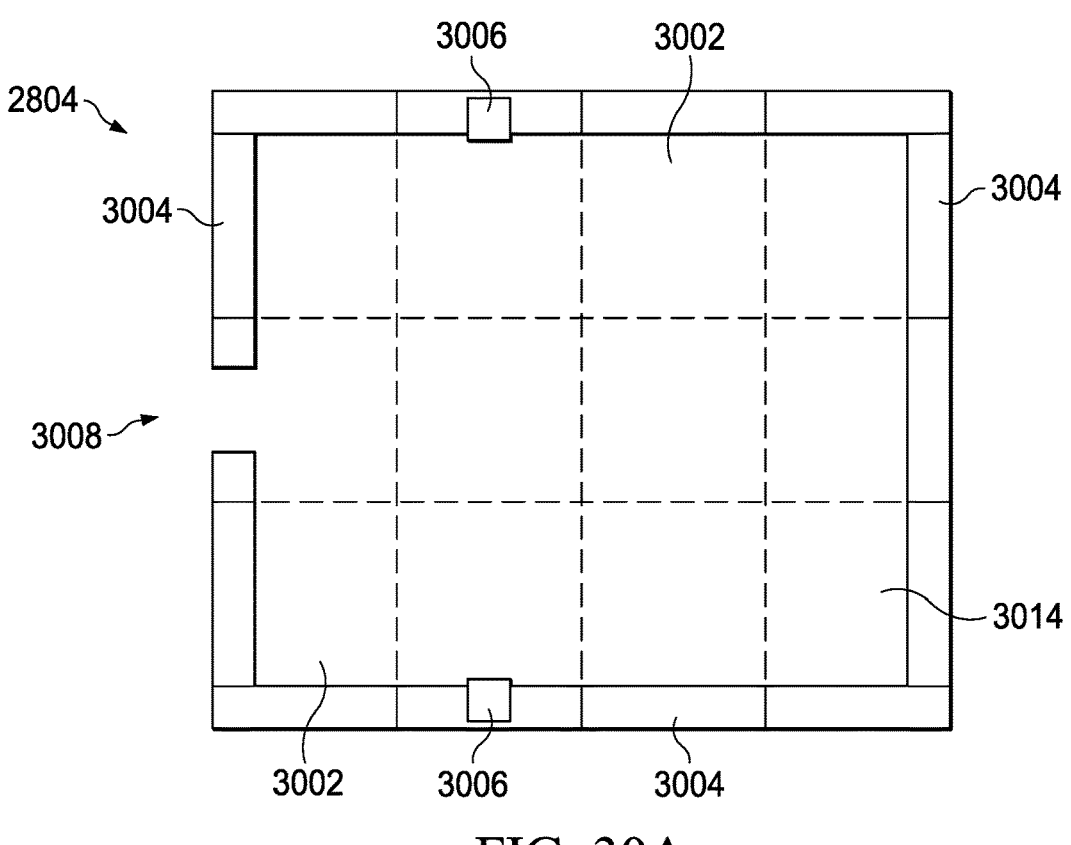
FIG. 30A illustrates the X by Y play environment including an internal transport/transition module.
Figure 30B:
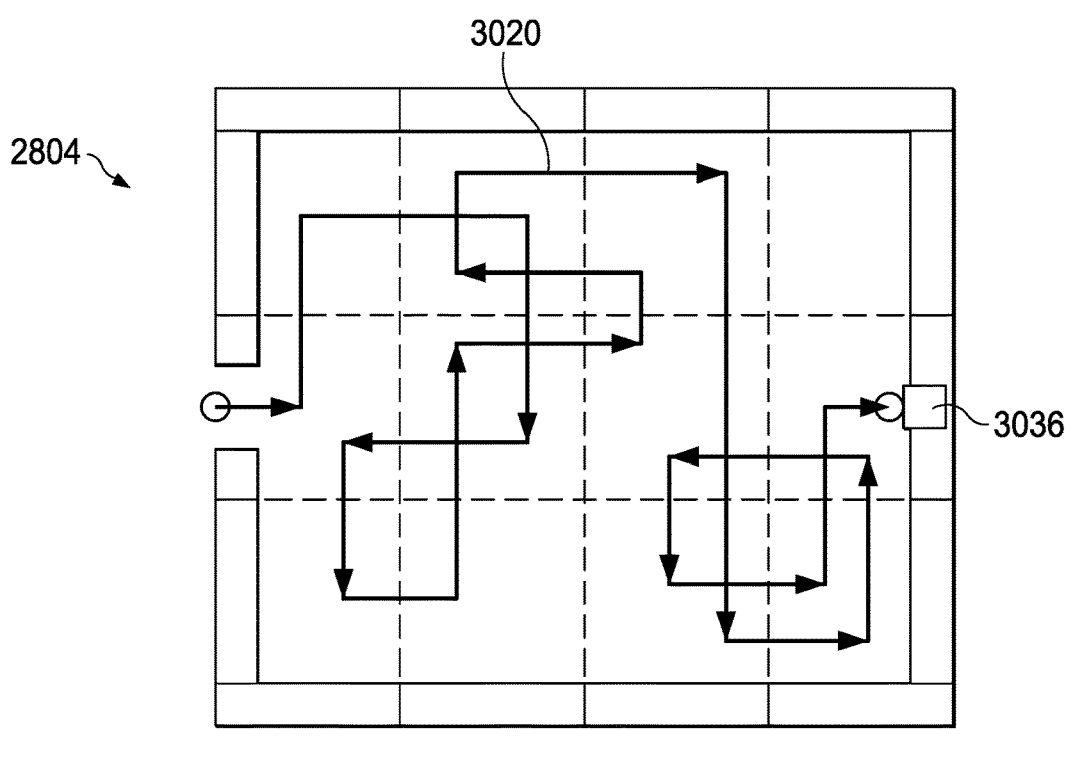
FIG. 30B illustrates the X by Y play environment showing movement within the X by Y area that simulates movement over a much larger area.

Referring now to FIGS. 29 and 30A-B, there are illustrated the various implementations of the physical environment 2804 and the transport/transition module 2806. FIG. 29 illustrates an implementation wherein the physical VR environment 2804 includes a transport/transition module 2806 located external to the defined X by Y area of the physical environment 2804. The physical environment 2804 includes the multiple floor panels (in this case 12) 2902 comprising the floor area of the physical X by Y environment 2804. The floor panels 2902 are covered by a decking as described hereinabove to describe the limits of the X by Y physical environment 2804, noting that any or all of these floor panels 2902 could have a haptic feedback function associated therewith. The X by Y area is enclosed by a number of wall panels 2904 located along the peripheral edges of the combined floor panels 2902. The wall panels 2904 define the edge limits past which a VR user may not physically pass while within the VR experience within the associated VR world. As used herein, the VR world is defined as a space within which the VR experience is situated for an individual. This VR world may actually be created so that it does not extend beyond the physical space defined by the wall panels 2904. However, it is possible that the VR world, as it appears to a user within the VR experience, could extend beyond the physical edge limits associated with and defined by the wall panels 2904. The VR world will have to be constructed such that the user within the VR experience would not be encouraged to travel in the VR world beyond some VR boundary. For example, there could be a virtual walkway in the VR world that would pass by a much larger area beyond a virtual wall that lined the virtual walkway. The user could, in the VR experience, view this much larger part of the VR world, but jumping over the virtual wall would result in the user possibly colliding with the wall panels 2904. It is also possible to patch together multiple different VR worlds from other VR systems. For example, there could be one VR world within a physical space located in one location in the country and another VR world within a physical space located in another location of the country. These two disparate VR worlds could be linked together as a single VR world, wherein the VR experience is shared between the two disparate VR worlds. A participant in the VR experience in one of the VR worlds could actually see and virtually interact with a participant in the VR experience in the other of the VR worlds, with the limitation that they could not travel across the two VR worlds. Each of the participants can see the other participant and virtually interact with them but just cannot travel within the same physical space upon which the respective VR world is mapped onto.

One or more haptic feedback devices 2906 are associated with particular wall panels 2904. The haptic feedback devices 2906 may comprise any number of functionalities such as those described hereinabove including, but not limited to, switches, fans, squirt bottles, heat generators, etc. that may provide a VR user with a physical feedback based upon actions that are occurring within the VR environment. The wall panels 2904 may also be configured to include door openings 2908 which may be used for an individual to enter the physical X by Y environment 2804. The transport/transition module 2806 may be connected at a panel location 2910 such that the transport/transition module is located outside of the X by Y area defined by the wall panels 2904. The transport/transition module 2806 includes panels 2904 defining sides of the module and includes one open side enabling entry into the X by Y physical area 2804 through panel location 2910.

FIG. 30A illustrates an alternative embodiment wherein the physical VR environment 2804 includes a transport/transition module 2806 located external to the defined X by Y area of the physical environment 2804. The physical environment 2804 includes the multiple floor panels (in this case 12) 3002 comprising the floor area of the physical X by Y environment 2804. The floor panels 3002 are covered by a decking as described hereinabove to define the limits of the X by Y physical environment 2804. The physical X by Y area is enclosed by a number of wall panels 2904 there located along the edges of the combined floor panels 2902. The wall panels 2904 define the edge limits past which a VR user may not pass while within the VR experience. In a similar manner to that described in FIG. 29, one or more haptic feedback devices 3006 are associated with particular wall panels 2904. The haptic feedback devices 3006 may comprise any number of functionalities such as those described hereinabove including, but not limited to, switches, fans, squirt bottles, heat generators, etc. that may provide a VR user with a physical feedback based upon actions that are occurring within the VR environment. The wall panels 3004 may also be configured to include door openings 3008 which may be used for an individual to enter the physical X by Y environment 2804. The transport/transition module 2806, rather than describing a module that is located external of the X by Y area, may be located at an area within the X by Y area as shown generally at 3014, and may be located as one of the floor panels or a subset of the area of floor panels. The transition/transport area 3014 may comprise a rumble plate or other movement mechanism located within a floor panel 3002 or subset of a floor panel for providing an area that may transfer a VR user from one VR environment to another VR environment within the same physical space.

Referring now to FIG. 30B, there is illustrated a further embodiment of the manner in which larger areas may be represented within the X by Y environment 2804 that does not make use of a transport module. The physical environment 2804 includes the multiple floor panels (in this case 12) 3032 comprising the floor area of the physical X by Y environment 2804. The floor panels 3032 are covered by a decking as described hereinabove to define the limits of the X by Y physical environment 2804. The physical X by Y area is enclosed by a number of wall panels 3034 there located along the edges of the combined floor panels 3032. The wall panels 3034 define the edge limits past which a VR user may not pass while within the VR experience. In a similar manner to that described in FIG. 29, one or more haptic feedback devices 3036 are associated with particular wall panels 3034. The haptic feedback devices 3036 may comprise any number of functionalities such as those described hereinabove including, but not limited to, switches, fans, squirt bottles, heat generators, etc. that may provide a VR user with a physical feedback based upon actions that are occurring within the VR environment. In this case, the VR system presenting the VR environment to a user defines a circuitous pathway 3020 within the X by Y environment 2804 in order to give the illusion of a much larger area within the defined limits of the X by Y environment 2804. In this case, the pathway 3020 provides multiple turns and passes back over itself within the X by Y environment 2804 in order to simulate traveling through a much larger area before coming in contact with the haptic device 3036. By following the circuitous path 3020, a player may assume they have traveled throughout a much larger area within the virtual reality environment rather than being limited to the physical X by Y environment 2804.

Figure 31:
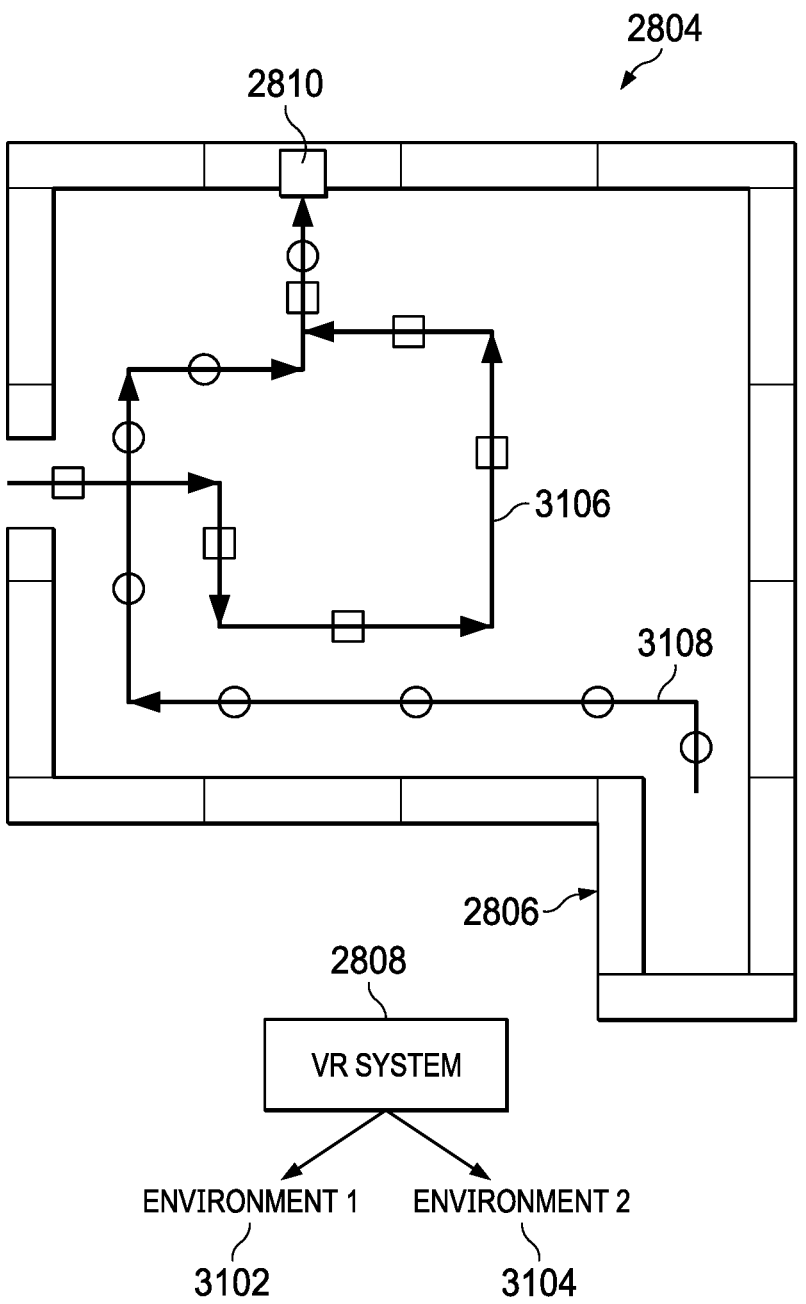
FIG. 31 illustrates the manner in which a VR system may generate multiple VR pathways within the X by Y VR environment.

Referring now to FIG. 31, the expanded VR environment 2802 described with respect to FIG. 28 is provided within the physical X by Y area 2804 using a combination of the transport module transport/transition module 2806, haptic device 2810 and control of the VR environment by the VR system 2808. The VR system 2808 generates a first VR environment 3102 and a second VR environment 3104 that are displayed to a VR user through a headset, goggles, glasses, etc. while they are located within the physical X by Y environment 2804 and the transport/transition module 2806. The environments are displayed to the VR user at different times to provide the illusion that the actual VR environment through which the VR user is moving is located in a much larger area than the area encompassed by the physical X by Y area 2804 and the transport/transition module 2806. Upon entering the physical X by Y area 2804, the first VR environment 3102 would be displayed to the VR user. This would happen for example when the user entered through a door. The first VR environment 3102 is displayed to the user until they enter the transport/transition module 2806. In one embodiment, the transport/transition module 2806 would simulate the operation of an elevator. The doors of the elevator would close and when opened again would display the second VR environment 3104 which could comprise another level of the virtual environment that the user was experiencing. The user would then explore the second VR environment 3104 upon exiting the transport/transition module 2806 into the physical X by Y area 2804. Again, all of this occurs within the edge limits of the physical X by Y area.

The display of the differing VR environments 3102 and 3104 also enables the system to make multiple uses of a same haptic feedback device 2810. For example, if the haptic feedback device 2810 comprised a switch or lever of some sort, the user upon entering the physical X by Y area 2804 through a door would be guided through a first virtual-reality pathway 3106 from the door to the haptic device 2810. After actuating the switch or lever comprising the haptic device 2810, the user would then be guided back to the transport/transition module 2806 within the VR environment 3102. It is noted that the haptic device 2810 is a passive device in that it can be physically experienced by the VR user but the program in the VR system 2808 in association with cameras that are disposed within the VR glasses worn by the VR user would actually display some visual depiction of the haptic device and optically register the interaction. The purpose of this is that it would then not be necessary to have some type of actual feedback from the haptic device to the VR system 2808. Although it is envisioned that there could be a physical feedback to the VR system 2808 from any haptic device 2810, one embodiment of the operation does not provide for such. For example, if the haptic device 2810 has an opening through which the player would insert their arm to experience spiders crawling on their arm after insertion thereof, the VR system 2808 would display within the virtual world some visual depiction of the haptic device, for example, an opening having spiders crawling all around the VR displayed outside surface and optically indexed to that haptic device 2810 such that the physical position of the physical haptic device 2810 is mapped to the virtual world. The virtual system 2808 would then optically recognize that the VR user had inserted their arm into the opening. There is no feedback or sensor to indicate that the arm was actually inserted within the opening but, rather, just an optical indication of such. VR system 2808 could then have a direct connection to the opening in order to actually activate the function of that haptic device 2810 or, alternatively, the haptic device could automatically locally sense insertion of the arm and be activated. In an alternate embodiment, there could be actual feedback between the haptic device 2810 and VR system 2808.

After being guided back to the transport/transition module 2806, the transport/transition module would then virtually transition the VR user to another environment/level in the VR world and upon exiting the transport/transition module 2806, the VR system would display the second VR environment 3104. The second VR environment 3104 would define a second VR pathway 3108 that took the VR user from the transport/transition module 2806 back to the haptic device 2810 through a different pathway than that previously used. From the perspective of the VR user, the VR user would be interacting with a virtually different switch within the VR environment even though they were moving through the same general physical X by Y area 2804 to the same haptic feedback device 2810. In this manner, by making multiple uses of the same haptic feedback device 2810 and the same physical X by Y area 2804, a much more expansive virtual reality environment may be perceived by the VR user than would be possible using only a single room, single environment experience. While the above example has been described with respect to the haptic feedback device 2810 comprising a switch or lever, it should be appreciated that the haptic feedback device may comprise any type of haptic feedback device such as a rumble plate located on the floor, a spray bottle, fan, a heat blower, etc.

Figures 32A, 32B:
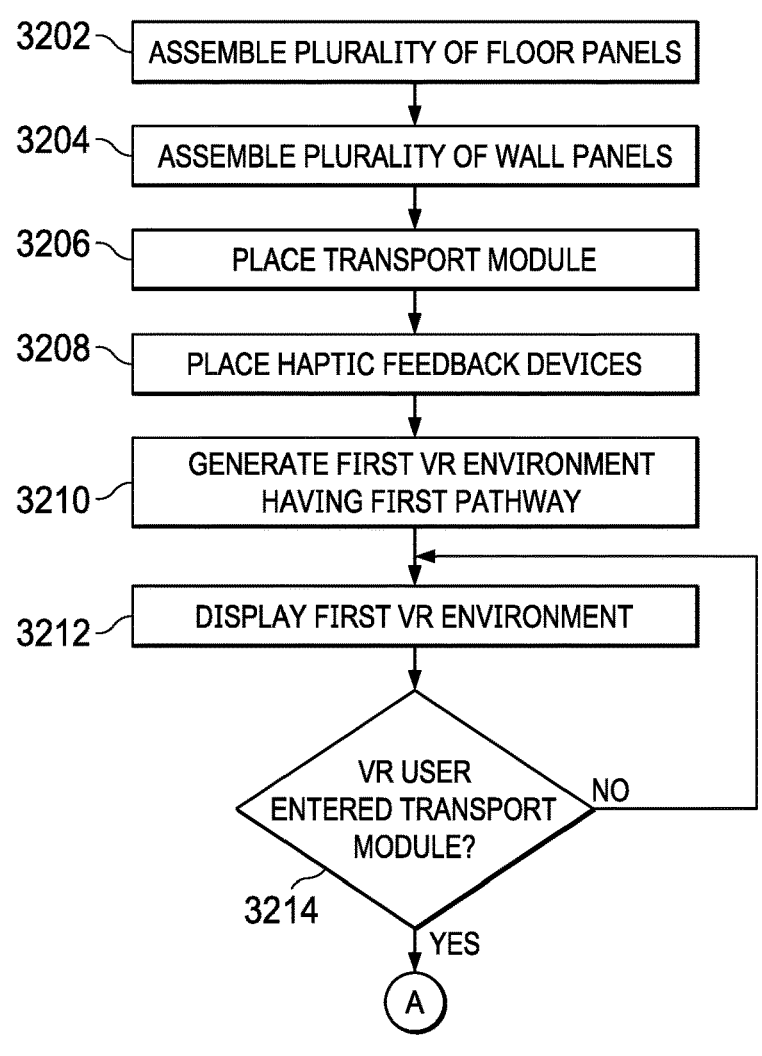
FIGS. 32A-B illustrate a flow diagram illustrating the process for utilizing the X by Y play environment to generate an expanded VR environment.

Referring now to FIGS. 32A-B, there is illustrated the process for configuring and operating an expanded virtual reality environment 2802 using the system and method described herein. Initially the physical X by Y area must be assembled by first assembling a plurality of floor panels 3202. These are interconnected in a manner similar to that described hereinabove with respect to the configurable virtual reality environment. After the floor panels are assembled, the plurality of wall panels are assembled around the peripheral edges defined by the assembled floor panels. A transport/transition module 2806 may then be placed at step 3206 with respect to the assembly of floor panels and wall panels. The transport/transition module may comprise either the module such as that illustrated in FIG. 29 that is located on the exterior of the X by Y area or be located within the X by Y area. Next, one or more haptic feedback devices are located within the X by Y area on either the wall panels or floor panels depending upon the type of haptic feedback that is being provided. Once the physical area associated with the virtual-reality experience has been assembled, the VR system 2808 generates the first VR environment defining the first VR pathway therein to lead a user toward a haptic device at step 3210. The generated first VR environment is then displayed to the user at step 3212 through their headset, goggles, glasses etc. in order to enable the VR user to experience the VR environment within the limits of the provided physical X by Y area. Inquiry step 3214 determines whether the VR user has entered the transport module within the first virtual-reality environment. If not, the VR system continues to display the first VR environment to the VR user. Once inquiry step 3214 determines that the VR user has entered the transport/transition module, the VR system generates the second VR environment that defines a second pathway that is different from the first pathway of the first VR environment to direct the VR user from the transition/transport module to the haptic feedback device at step 3216. This second VR environment is then displayed to the user through the headset/goggles/glasses of the user. The process for displaying different virtual-reality environments to a user upon entering and exiting the transport/transition module may continue for a number of iterations in order to provide multiple VR levels within a particular expanded VR environment. The process is completed at step 3220.

The virtual-reality environments displayed to a VR user utilizing the physical X by Y area environment may be used in any number of situations. The system may be utilized in the entertainment environment to enable users to play games and activities for entertainment purposes. The system may also be used in a training environment to train soldiers, policemen, firefighters, doctors, etc. for various possibilities that may arise in the real world. Additionally, the system could be used in a trade show environment to enable vendors to display and demonstrate their products in a virtual reality environment that allows customers to have a more immersive experience.

While the above example has been described with the use of the system having configurable floor panels and wall panels as described hereinabove, the system may also be assembled using only wall panels or by placing the haptic feedback devices and transport/transition module in existing physical floors and walls. In one embodiment, VR glasses are utilized and indexing is facilitated by having a certain random pattern of random lines disposed on the wall panels. Cameras on the VR glasses can recognize these random patterns in order to recognize the actual physical boundaries. In this manner, a VR user with these VR glasses becomes "untethered" with respect to the VR system 2808, i.e., they are free roaming. This differs compared with the tethered systems wherein a user utilizing VR glasses has the VR glasses connected to a processor via some cable, or the such. The cable can be such that the user must remain in a fixed or seated position, or the cable may be long enough to allow the user some ability to roam.

Figure 33:
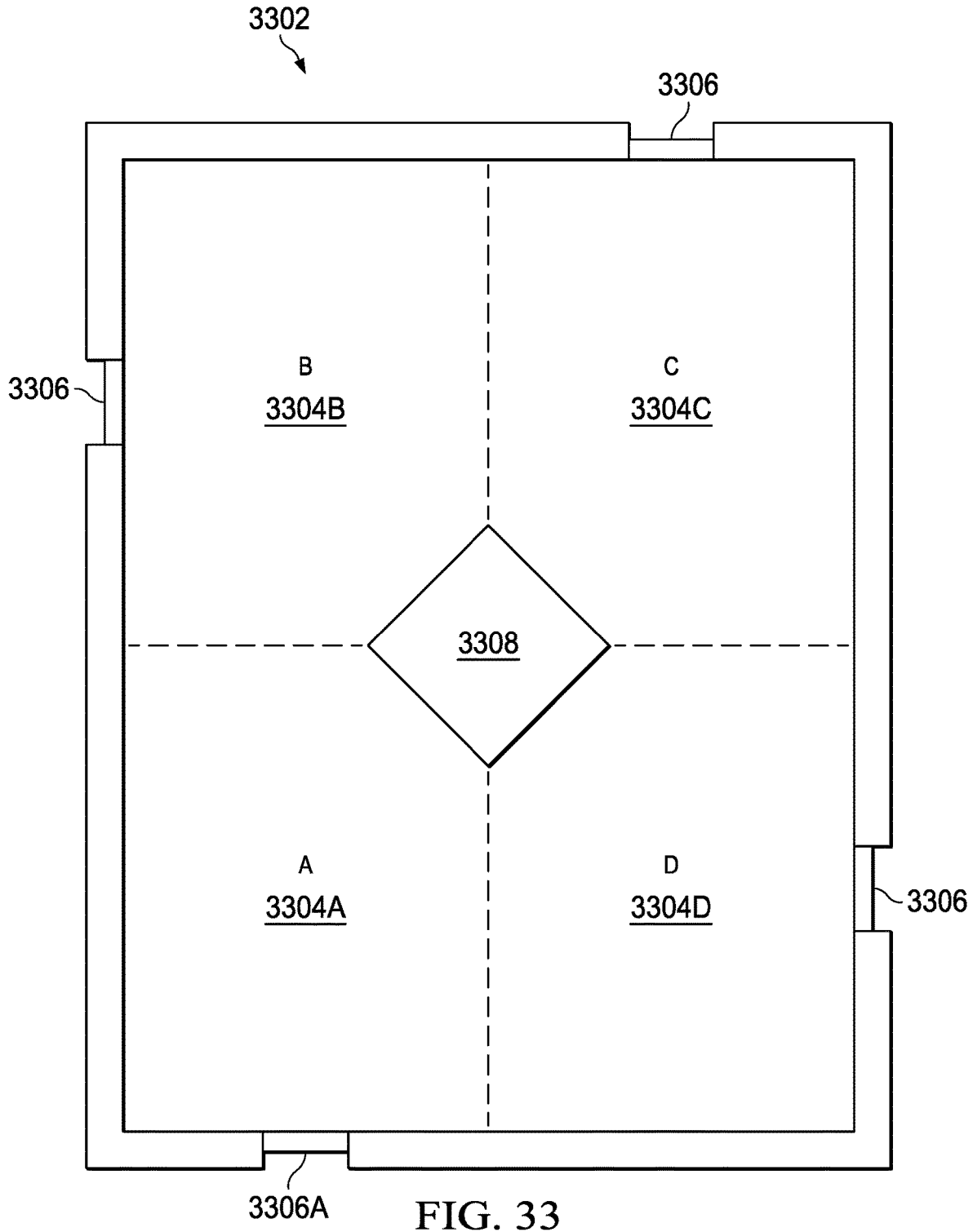
FIG. 33 illustrates the use of a X by Y play environment that is subdivided into smaller quadrants.

Referring now to FIG. 33, there is illustrated an X by Y area 3302 that is subdivided into four separate virtual quadrants 3304. Each of the virtual quadrants 3304 may be accessed by an external physical door 3306 or a virtual central transport module 3308. Using the single X by Y area 3302 players may be presented with multiple different virtual-reality environments within each of the quadrants 3304. Thus, the VR users in quadrant 3304A could be presented with a first virtual-reality room of a haunted house. The VR users would enter through the door 3306A and move throughout a first virtual-reality environment represented only within quadrant a 3304A. Each of the VR users would exit the quadrant 3304A by entering into the transport area 3308 that would simulate an elevator or some other type of means for moving the VR user from one virtual reality environment to the next and then enable the VR user to enter quadrant B 3304B to begin play within the new virtual reality environment distinct from that in quadrant A. In a similar manner VR users would proceed onward to quadrant C 3404C and quadrant D 3404D as play within each of the particular quadrant areas was completed.

A single group of players may be within each of the quadrants 3404 of the X by Y area 3302 during gameplay. Thus, a first group of VR users would be experiencing a first virtual-reality environment in quadrant 3304A, a second group of VR users would be experiencing a second virtual reality environment in quadrant 3304B, a third group of VR users would be experiencing a third virtual reality environment in quadrant 3304C and a fourth group of VR users would be experiencing a fourth virtual-reality environment in quadrant 3304D. This allows for a greater throughput of VR users using a single X by Y area 3302. Since multiple VR users are being utilized with and each of the quadrants 3304 there must be a process for controlling the flow of VR users between quadrants such that only the same group of VR users are present within a particular quadrant at a particular time. Gameplay problems will arise if multiple groups of VR users were present within a same quadrant wherein each of the different groups of VR users were utilizing a different virtual-reality environment.

Figure 34:
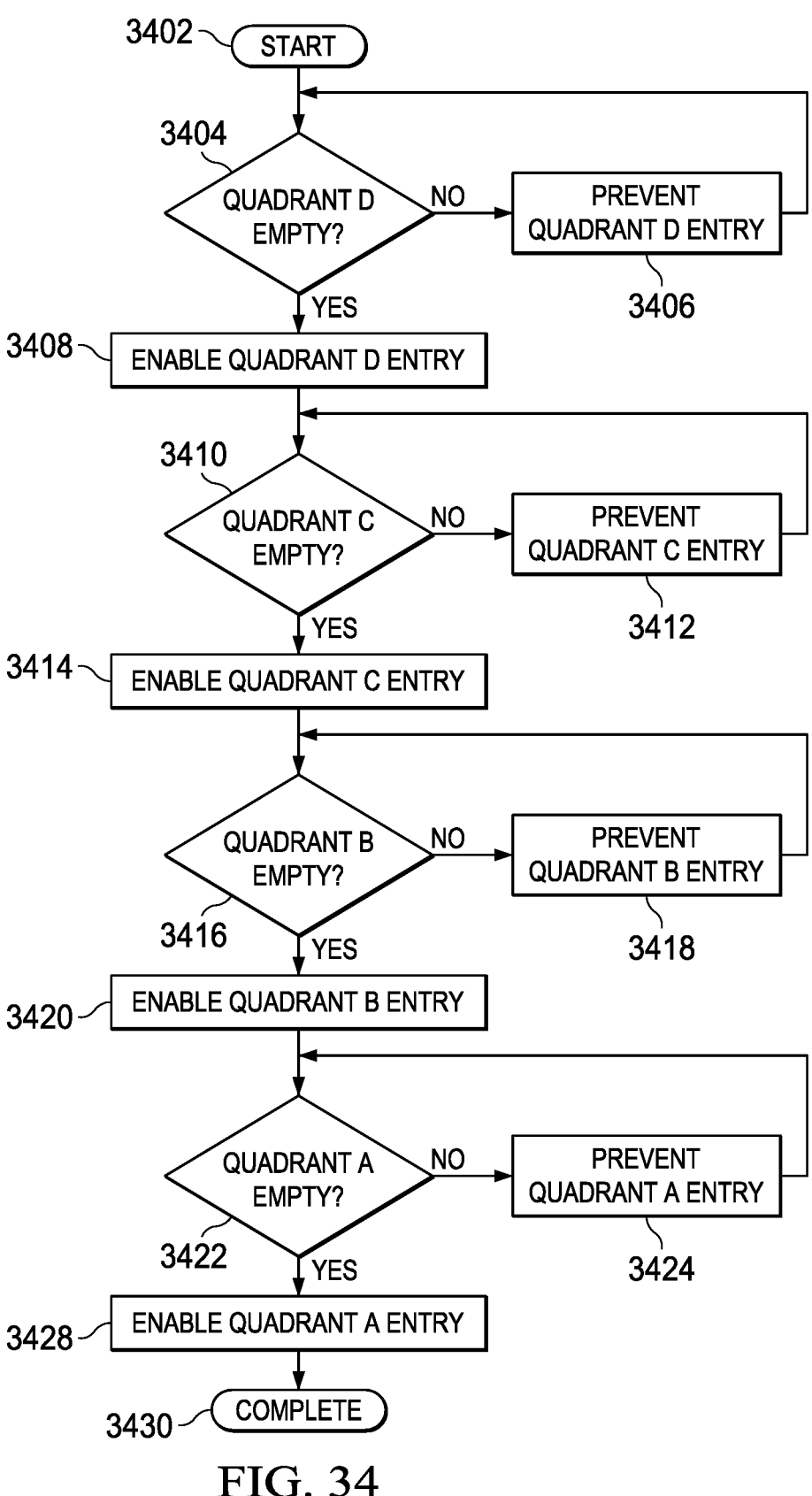
FIG. 34 illustrates a flow diagram of the manner for controlling movement of individuals between the quadrants of the X by Y play environment illustrated in FIG. 33.

Referring now to FIG. 34, there is illustrated a flow diagram describing one process for controlling the movement of VR users between each of the quadrants in a manner that will enable only a single group of players to be present within a particular quadrant at a particular point in time. The process is initiated at step 3402 and inquiry step 3404 determines whether quadrant D 3304D is currently empty. If the quadrant 3304D is not empty, step 3406 prevents new VR users from entering into quadrant D and may encourage movement of individuals from quadrant D as will be more fully described herein below with respect to FIG. 35. Control passes back to step 3404 to again determine whether quadrant D is empty. When inquiry step 3404 determines that quadrant D is empty, the system enables entry into quadrant D at step 3408 by new VR users. The process continues and inquiry step 3410 determines whether quadrant C 3304C is currently empty. If the quadrant 3304C is not empty, step 3412 prevents new VR users from entering into quadrant C and may encourage movement of VR users from quadrant C as will be more fully described herein below with respect to FIG. 35. Control passes back to step 3408 to again determine whether quadrant C is empty. When inquiry step 3410 determines that quadrant C is empty, the system enables entry into quadrant D at step 3414 by new VR users.

Inquiry step 3416 next determines whether quadrant B 3304B is currently empty. If the quadrant 3304B is not empty, step 3418 prevents new VR users into quadrant B and may encourage movement of VR users from quadrant B as will be more fully described herein below with respect to FIG. 35. Control passes back to step 3416 to again determine whether quadrant B is empty. When inquiry step 3416 determines that quadrant B is empty, the system enables entry into quadrant B at step 3420 by new VR users. Finally, inquiry step 3422 determines whether quadrant A 3304A is currently empty. If the quadrant 3304A is not empty, step 3424 prevents new VR users into quadrant A and may encourage movement of VR users from quadrant A as will be more fully described herein below with respect to FIG. 35. Control passes back to step 3422 to again determine whether quadrant A is empty. When inquiry step 3422 determines that quadrant a is empty, the system enables entry into quadrant A at step 3428 by new VR users. The process is completed at step 3430.

It is noted that, when a group of VR users is physically present in one of the quadrants and interacting with the associated VR world created for that quadrant, it is important that exit from that quadrant requires all of the VR users in that group to enter the transport/transition module 3308. The transport/transition module 3308 could be a virtual elevator, wherein the doors would virtually close after all of the virtual users in that group have entered the transport/transition module. The virtual elevator would then give the impression that it was moving and then the door opens into the next of the quadrants into a different virtual world. The transport/transition module 3308 could also be created such that a light flashes with the image going completely white and then a new virtual world opening into the next quadrant. From a flow process, the goal of the system is to ensure that multiple VR users in one quadrant are not allowed to move to the next quadrant until the next quadrant has been cleared of any virtual users occupying that quadrant.

Figures 35A, 36:
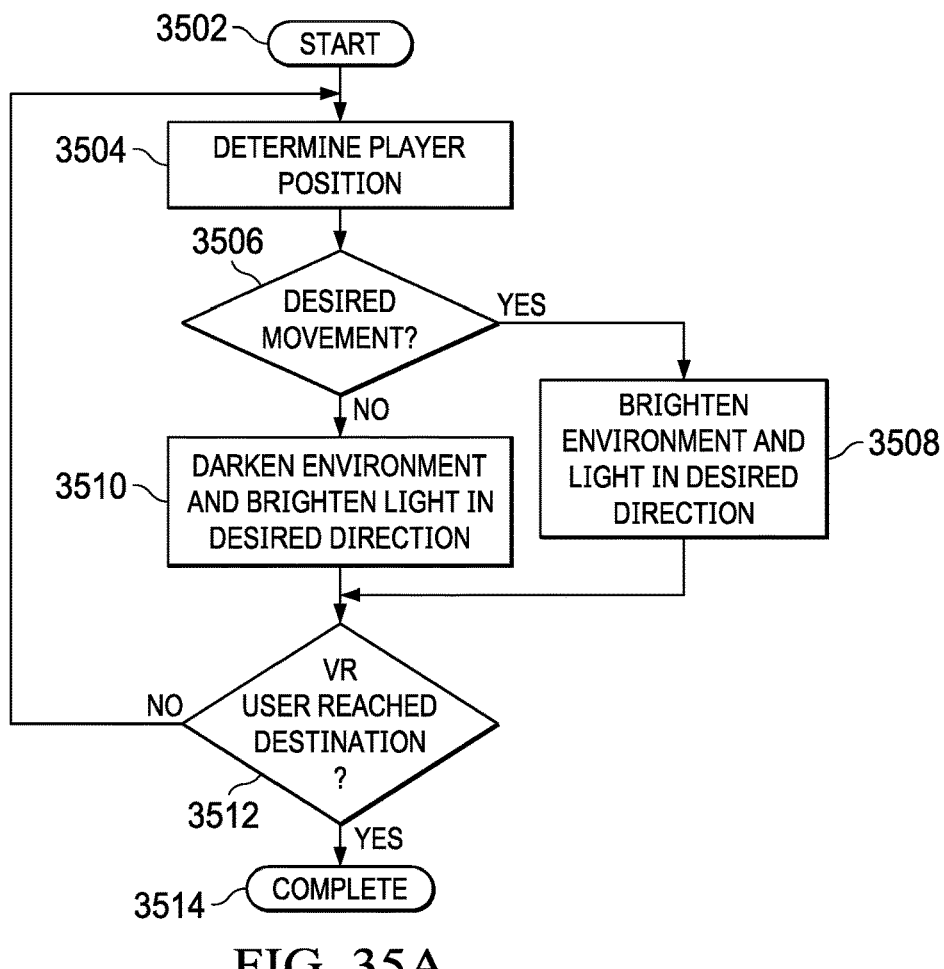
FIGS. 35A-B illustrate flow diagrams of processes for controlling player movement within a quadrant of the X by Y play environment illustrated in FIG. 33.
FIG. 36 illustrates a general representation of a virtual-reality map consisting of a plurality of tile segments.

Referring now to FIG. 35A there is illustrated a flow diagram of a process for one manner of encouraging VR users to move in a particular location or direction in order to move them out of a particular quadrant and into another or out of the X by Y area. It should be realized that other techniques may be used for moving VR users in a desired direction. The process is initiated at step 3502 and the present position of the VR user within the VR environment is determined at step 3504. Inquiry step 3506 determines if the position of the VR user indicates movement to a desired position or movement in a particular direction. If movement into a desired position or in a particular direction is not present, the VR environment around the VR user may be darkened and a light made brighter in a desired direction of movement that the system wishes to have the VR user move at step 3510. If inquiry step 3506 determines the VR user is in a desired position or moving in a desired direction of movement, the VR system may brighten the environment and provide a brighter light in a desired direction of VR user movement at step 3508. Inquiry step 3512 determines if the VR user has reached a desired location and if not, control passes back to step 3504 to again determine the VR user position. If inquiry step 3512 determines that the desired destination has been reached and the process is completed at step 3510. The above process of darkening an environment when a player moves away from a desired direction of gameplay and lightens the environment as the user moves toward the desired direction of gameplay may be utilized in any of the quadrants 3304 in order to encourage a desired gameplay direction. These techniques could be used in association with any of steps 3406, 3412, 3418 and 3424 of FIG. 34 in order to encourage VR user movement in desired directions.

Figure 35B:
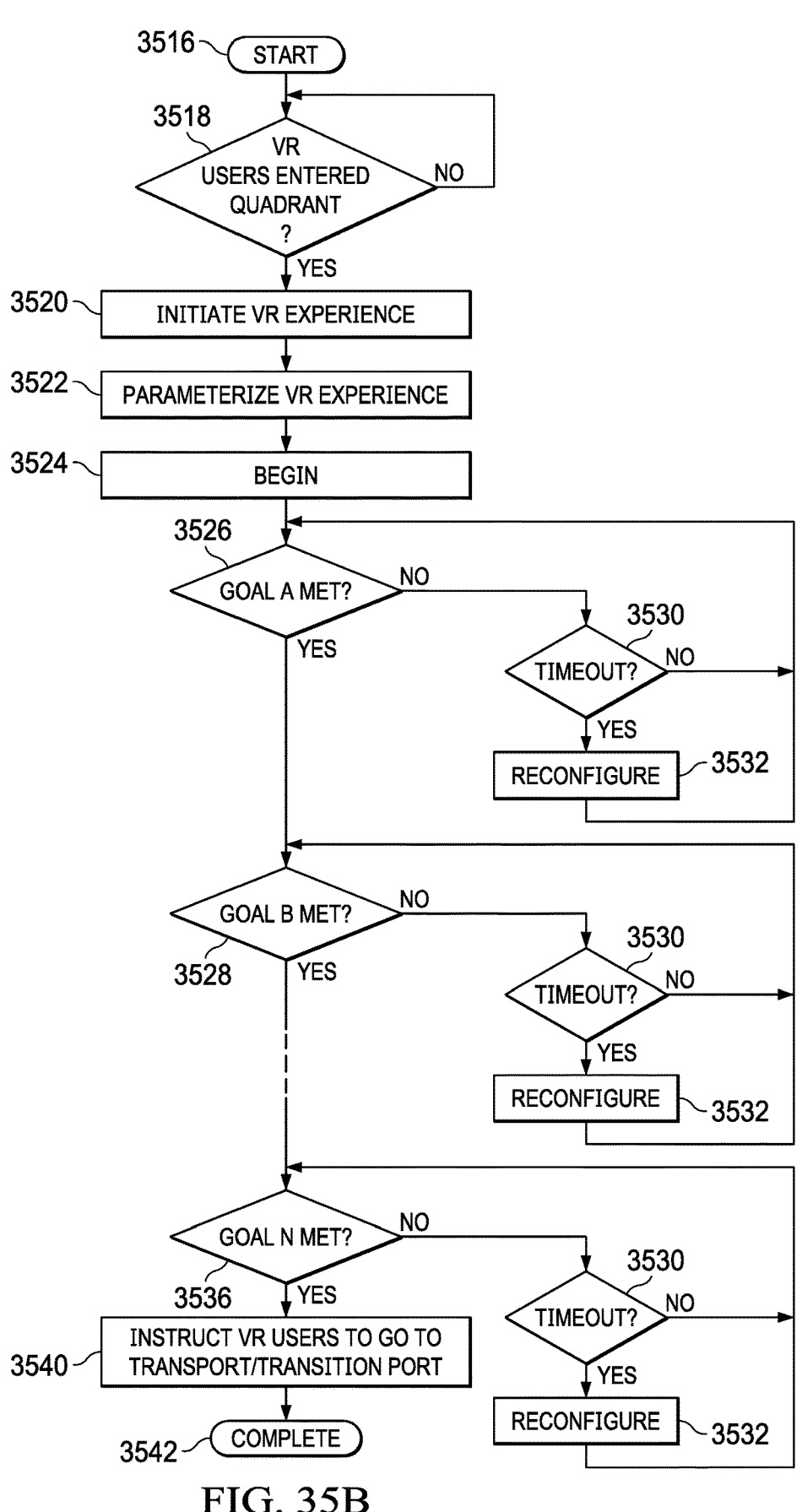

Referring now to FIG. 35B, there is illustrated a flowchart depicting an alternate process for encouraging flow through the virtual world. As described hereinabove, it is desirable that VR users do not occupy a particular virtual war for more than a finite amount of time. For example, in a game such as an escape room, VR users are allowed to move into a first quadrant and be presented with a first challenge. As soon as possible the VR users as a group in that particular quadrant complete the challenge, they can then move on to the next quadrant. However, the particular virtual world depicted in FIG. 33 only has four quadrants and, therefore, can only accommodate four groups of VR users at any one time. It is thus important to control the flow through each of the quadrants, wherein each quadrant in this example escape room must present each group with a unique challenge with the desire by the operator of the system that the challenge be completed within a certain window of time. Say, for example, that the time to flow through all four quadrants is set at a goal of 40 minutes. That would mean that each group of VR users would occupy any one quadrant for approximately 10 minutes. However, this requires that the challenge be completed within that 10 minute goal. The challenge could be designed such that this was achievable, but each group of VR users is by definition different since they are all comprised of individuals with a different way of solving or approaching a challenge.

In one example shown in FIG. 35, the process is initiated at a Start block 3516 and then proceeds to a decision block

3518 to determine if all of the VR users have entered a particular quadrant. Once complete, the process flows to a function block 3520 along a "Y" path of function block 3522, wherein the VR experience is parameterized for this particular quadrant. This parameterization of a particular quadrant is an operation that creates the virtual world that is presented to the VR users in that particular group and that particular quadrant that is associated with the challenge presented thereto. For example, there may be 10 items that must be discovered in a particular order within that particular "VR room" associated with the challenge. This might require opening virtual drawers, looking under virtual objects until the objects are found. However, as will be described here below, this is a dynamic operation.

Once parameterized, the process flows to a function block 3524 in order to begin the challenge and then the process flows to a decision block 3526. In decision block 3526, a determination is made as to whether the first goal is met. This is Goal A. In each VR room, it is possible that it was made known to the VR users in the group that instructions will be found on a piece of virtual paper. The first step and instruction would be to, for example, find a key. Thus, all of the VR users in that group would search for Key. If the goal is met, the program follows along the "Y" path to a second decision block 3528 associated with a second goal, Goal B. However, until the Goal A in decision block 3526 is met, the process will flow along the "N" half to a timeout block 3530 to determine if this particular step in the process is taking too long. If not, the program flows along a "N" path back to the input of the decision block 3526. However, when a certain amount of time has elapsed that is set by the overall process, it is possible to reconfigure the system. As an example, consider that the key in the first step is originally disposed within a virtual drawer in the right side of the room. If the key is not found by one of the VR users opening that virtual drawer within the pre-allotted amount of time, the system can be reconfigured such that the key will appear under the next object or area examined by any of the VR users. The program associated with the VR experience is just re-parameterized in this situation. This is illustrated in the function block 3532. Once reconfigured, the process flows back to the input of the decision block 3526 to determine if one of the VR users has recognized that the key exists under the object or area examined. If not, a further reconfiguration can be made, such as flashing the key once found.

There is a timeout block 3530 and reconfigure block 3532 associated with each of the goal decision blocks. Each of the goal decision blocks will continue until reaching a final goal decision block 3536 for the last goal, the Goal "N." Once his last goal has been met, the process flows along the "Y" path from the decision block 3536 to a function block 3540 in order to instruct all of the VR users to go to the transport/transition port. The process associated with FIG. 35A can be used to motivate the VR users in the particular group to move to the transport/transition module. In addition to adjusting a time for each goal, it is possible to actually increase or decrease the goals required for each challenge. It may be that the goals would be increased in the event a group ahead of the particular group has not completed their challenge in the next quadrant. If a particular group of VR users is having a difficult time with the challenge, the number of goals could be reduced. For example, if the group ahead of them had completed their challenge and had already moved the next quadrant, it might be that the next goal to be completed by the current group constitutes a completion of a challenge. It is important to provide a sufficient amount of time for the VR users in a particular group to appreciate a particular VR experience in a particular quadrant without pushing them through too fast, but it is also important that they do not "linger" in any particular quadrant. Once in the transfer/transition part, the process flows to be Continue block 3542 to allow the group of VR users to proceed to the next quadrant.

The ability to uniquely tailor various virtual-reality maps to a particular physical environment would provide the unique ability to configure any virtual reality map to the configuration of an existing physical site in which an individual VR user would interact when experiencing the virtual reality map. The physical area may comprise a large open area that may have various support columns therein which must be accounted for within the virtual-reality mapping. Additionally, smaller size areas may be used that have differing shapes that may not directly fit with one embodiment of a virtual-reality map. One manner for dealing with the variations between virtual-reality maps and available physical space is illustrated with respect to FIGS. 36-40.

FIG. 36 illustrates a general representation of a virtual-reality map 3602. The virtual-reality map 3602 is made up of a plurality of tile segments 3604. Each of the tile segments 3604 may represent an individual room of a larger virtual-reality environment or alternatively, could represent a portion of a larger virtual-reality room. Each of the tiles 3604 represent an individual portion of a larger overall virtual-reality map 3602. Each of the tiles 3604 may be independently moved to a new location and be associated with other tiles 3604 of the virtual-reality map 3602 in different spatial configurations. Thus, for example, FIG. 36 illustrates a variety of tiles 3604 arranged in an adjacent row and column configuration were each tile directly abuts 2 to 4 other tiles depending upon its location within the virtual-reality map 3602. Each of the individual tiles 3604 is independently movable with respect to the other tiles within the virtual-reality map 3602. Thus, the tiles may be arranged in the row and column configuration illustrated in FIG. 36, in a horizontal linear configuration, in a vertical linear configuration or in any other arrangement that enables an interface between two adjacent tiles to be physically located. If two tiles 3604 are not directly adjacent to enable a door or other means of interface between the tiles in the VR world, connection interfaces such as hallways, pathways, etc. may be used to provide generic connections between the virtual-reality areas represented by two separate tiles. This will be more fully described herein below. In this manner, the tiles 3604 may be arranged to have the represented VR world map fit within the constraints of a physical space that is available for use of the virtual-reality system such that VR users of the virtual-reality system will not run into physical barriers within the physical space such as a support column or wall.

To more particularly illustrate the use of multiple tiles 3604 within a virtual reality map 3602, FIG. 37 illustrates a simplified version of the virtual-reality map 3602 consisting of three separate tiles 3604. Each of the tiles 3604 represent an individual room or area within a particular virtual-reality map 3602. As shown in FIG. 38, the tiles 3604 can be arranged in a horizontal linear configuration wherein tile 2 is placed directly adjacent to tile 1 and tile 3 is placed directly adjacent to tile 2 in a horizontal linear configuration. Tiles 1 and 2 interact with each other through an interface 3802 which may comprise a door or some other type of portal or opening. In a similar fashion tiles 2 and 3 are accessible from each other through an interface 3804. It will be realized by one skilled in the art that any number of tiles may be utilized in configuring the virtual-reality map 3602 and these tiles may interact with each other in a variety of configurations/orientations as described herein.

Referring now to FIG. 39, there is illustrated another configuration of multiple tiles 3604 wherein tiles 1 and 2 are placed adjacent to each other in a horizontal direction while tiles 2 and 3 are adjacent in the vertical direction with tile 3 being placed immediately below tile 2. Tiles 1 and 2 are interconnected via an interface 3902 and tiles 2 and 3 are interconnected via an interface 3904. As discussed previously, the interfaces 3902 and 3904 may comprise doors portals or some other means for interconnecting the areas represented by the tiles 3604 in the VR world. It should be appreciated that tile 3 could be placed at any location surrounding the interconnected tile 1 and tile 2. The purpose for this arrangement could be to avoid physical obstacles in the areas indicated generally by 3906 that may include a support structure or wall.

Referring now to FIG. 40, there is illustrated a configuration of tile 1, tile 2 and tile 3 wherein rather than placing the tiles directly adjacent to each other within a virtual reality map 3602 the tiles 3604 are spatially separated from each other by a defined distance. In this case, since an interface may not directly provide access between the tiles 3604, tiles 3604 are interconnected via a short connector 4002. The connector 4002 may comprise a hallway, pathway or other type of generic interconnection between the areas represented by two separate tiles 3604. The connector 4002 may be a set of connectors that can map to different physical lengths and have different shapes, such as a right angle corridor, a straight corridor or any shape of quarter. Each of types of connectors 4002 can be modularized with the shape and the length of each shape or each segment in a shape to facilitate any physical mapping.

Each connector 4002 includes an interface 4004 at the opposing ends thereof to enable access to the tile 3604 located at that and of the connector. Thus, as shown in FIG. 40, tile 1 and tile 2 are separated from each other by a particular distance and interconnected by a connector 4002 that may comprise a hallway or pathway having an interface 4004 at each end thereof enabling an individual in the VR world to pass between the VR areas represented by tile 1 and tile 2. Similarly, tile 2 and tile 3 are located at an angle to each other but interconnected by a slanting connector 4002 representing a hallway or pathway of some type also having an interface 4004 at each end thereof. The use of the connectors 4002 enable the placement of the tiles 3604 at a variety of different orientations with respect to each other. This could be very useful in quickly tailoring a VR map 3602 to be utilized within a particular physical space that may be available.

It will be appreciated by those skilled in the art having the benefit of this disclosure that this system and method for haptic mapping of a configurable virtual reality environment provides a flexible manner for creating a configurable virtual-reality environment that a user may physically interact with while operating within a virtual-reality world. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for providing a virtual reality experience to a VR user, comprising:

providing a plurality of wall panels at a plurality of wall panel locations defining a primary physical area within an interior of the plurality of wall panels;

providing a transition area associated with the primary physical area;

associating at least one haptic feedback device with at least one of the plurality of wall panels for providing haptic feedback to a user;

displaying, using a virtual reality system, a first virtual reality environment to a user within the primary physical area, the first virtual reality environment defining a first virtual reality pathway with a first virtual reality circuitous pathway for the user that uses a first circuitous physical path area within the primary physical area that leads physically to and terminates with the at least one haptic feedback device to allow the VR user to interact with the haptic feedback device and wherein the first virtual reality circuitous pathway crosses over portions of the primary physical area multiple times within the first virtual reality circuitous pathway;

detecting entry of the user into the transition area while in the first virtual reality environment; and displaying, using the virtual reality system, a second virtual reality environment different from the first virtual reality environment within the primary physical area, the second virtual reality environment defining a second virtual pathway with a second virtual reality circuitous pathway for the user that uses a second circuitous physical path area that intersects with at least a portion of the first circuitous physical path area within the primary physical area that leads physically to and terminates with the at least one haptic feedback device to allow the VR user to interact with the haptic feedback device and wherein the second virtual reality circuitous pathway crosses over portions of the primary physical area multiple times within the second virtual reality circuitous pathway, which second virtual pathway is different from the first virtual reality pathway responsive to the user entering the transition area while in the first virtual reality environment.

2. The method of claim 1 further comprising associating the transition area with at least one of the plurality of wall panel locations.

3. The method of claim 1 wherein the providing further comprises providing a plurality of floor panels defining a floor of the primary physical area within the plurality of wall panels.

4. The method of claim 3, wherein providing further comprises removably connecting the plurality of floor panels to each other and further comprising removably connecting the plurality of wall panels to the plurality of floor panels.

5. The method of claim 1, wherein displaying the first and second virtual reality environments further comprise displaying virtual obstacles by the virtual reality system within the primary physical area to define the first and second virtual reality pathways.

6. The method of claim 1, wherein displaying the first and second virtual reality environments further comprises displaying virtual walls corresponding to the plurality of wall panels defining the primary physical area.

7. The method of claim 1, wherein the transition area further comprises a transition module associated with at least one of the wall panel locations.

* * * * *